(12) United States Patent
Ram et al.

(10) Patent No.: US 9,979,449 B2
(45) Date of Patent: May 22, 2018

(54) SYSTEMS AND METHODS FOR DETECTING DATA IN A RECEIVED MULTIPLE-INPUT-MULTIPLE-OUTPUT (MIMO) SIGNAL

(71) Applicant: Marvell World Trade Ltd., St. Michael (BB)

(72) Inventors: B Hari Ram, Chennai (IN); Lokesh Sundaramurthy Satrasala, Bangalore (IN); Sri Varsha Rottela, Andhra Pradesh (IN); Sudhir Srinivasa, Campbell, CA (US); Hongyuan Zhang, Fremont, CA (US); Chusong Xiao, Union City, CA (US); Mao Yu, San Jose, CA (US); Yanni Chen, Sunnyvale, CA (US); Yong Ma, San Jose, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days. days.

(21) Appl. No.: 15/267,957

(22) Filed: Sep. 16, 2016

(65) Prior Publication Data

US 2017/0117944 A1    Apr. 27, 2017

Related U.S. Application Data

(60) Provisional application No. 62/244,335, filed on Oct. 21, 2015.

(51) Int. Cl.
*H04Q 1/20* (2006.01)
*H04B 7/0456* (2017.01)
(Continued)

(52) U.S. Cl.
CPC .......... *H04B 7/0456* (2013.01); *H04L 5/0023* (2013.01); *H04W 72/085* (2013.01); *H04L 1/0054* (2013.01)

(58) Field of Classification Search
CPC . H04L 2025/03426; H04L 2025/03414; H04L 2025/03726; H04L 25/0204; H04L 27/2647; H04L 1/0054
(Continued)

(56) References Cited

U.S. PATENT DOCUMENTS 8,094,744 B1    6/2012  Song et al.
8,331,475 B1   12/2012  Palanivelu et al.
(Continued)

OTHER PUBLICATIONS

International Search Report and Written Opinion dated Dec. 7, 2016 mailed in related/corresponding PCT Patent Application No. PCT/US16/52183, filed Sep. 16, 2016.

*Primary Examiner* — Leila Malek

(57) ABSTRACT

Systems and methods for detecting data in a received multiple-input-multiple-output signal are provided. N signals are received from N respective antennas, where the received signals are associated with (i) M sets of data values, (ii) a set of symbols, and (iii) a set of carrier frequencies. The N signals are formed into a received signal vector y, and one or more transformations are performed on the received signal vector y to obtain a transformed vector. A plurality of samples are formed from the transformed vector. For samples of the plurality of samples, a data detection technique of a plurality of data detection techniques is selected. The selecting is based on at least one of a spatial stream, a symbol, and a carrier frequency associated with the given sample. The selected data detection, technique is used to detect data of the given sample.

15 Claims, 12 Drawing Sheets

(51) Int. Cl.
 *H04L 5/00* (2006.01)
 *H04W 72/08* (2009.01)
 *H04L 1/00* (2006.01)

(58) Field of Classification Search
 USPC .................. 375/260, 340, 341, 259, 227
 See application file for complete search history.

(56) References Cited

U.S. PATENT DOCUMENTS

| | | | |
|---|---|---|---|
| 8,411,786 B1 * | 4/2013 | Song | H04L 1/0036 375/267 |
| 8,903,025 B1 | 12/2014 | Chandrasekar et al. | |
| 2005/0105631 A1 * | 5/2005 | Giannakis | H04B 7/0669 375/267 |
| 2006/0018410 A1 | 1/2006 | Onggosanusi et al. | |
| 2007/0258536 A1 | 11/2007 | Kim et al. | |
| 2008/0260002 A1 | 10/2008 | Zhang et al. | |
| 2013/0243062 A1 * | 9/2013 | Raju | H04L 25/0204 375/226 |
| 2014/0133535 A1 | 5/2014 | Orlik et al. | |

\* cited by examiner

FIG. 2A

|  | Stream 1 | Stream 2 | Stream 3 |
|---|---|---|---|
| Symbol 1 | 1 | 0 | 0 |
| Symbol 2 | 0 | 1 | 0 |
| Symbol 3 | 0 | 0 | 1 |

FIG. 2B

|  | Carrier 1 | Carrier 2 | Carrier 3 |
|---|---|---|---|
| Symbol 1 | 1 | 0 | 0 |
| Symbol 2 | 0 | 1 | 0 |
| Symbol 3 | 0 | 0 | 1 |

FIG. 2C

|  | Carrier 1 | Carrier 2 | Carrier 3 |
|---|---|---|---|
| Stream 1 | 1 | 0 | 0 |
| Stream 2 | 0 | 1 | 0 |
| Stream 3 | 0 | 0 | 1 |

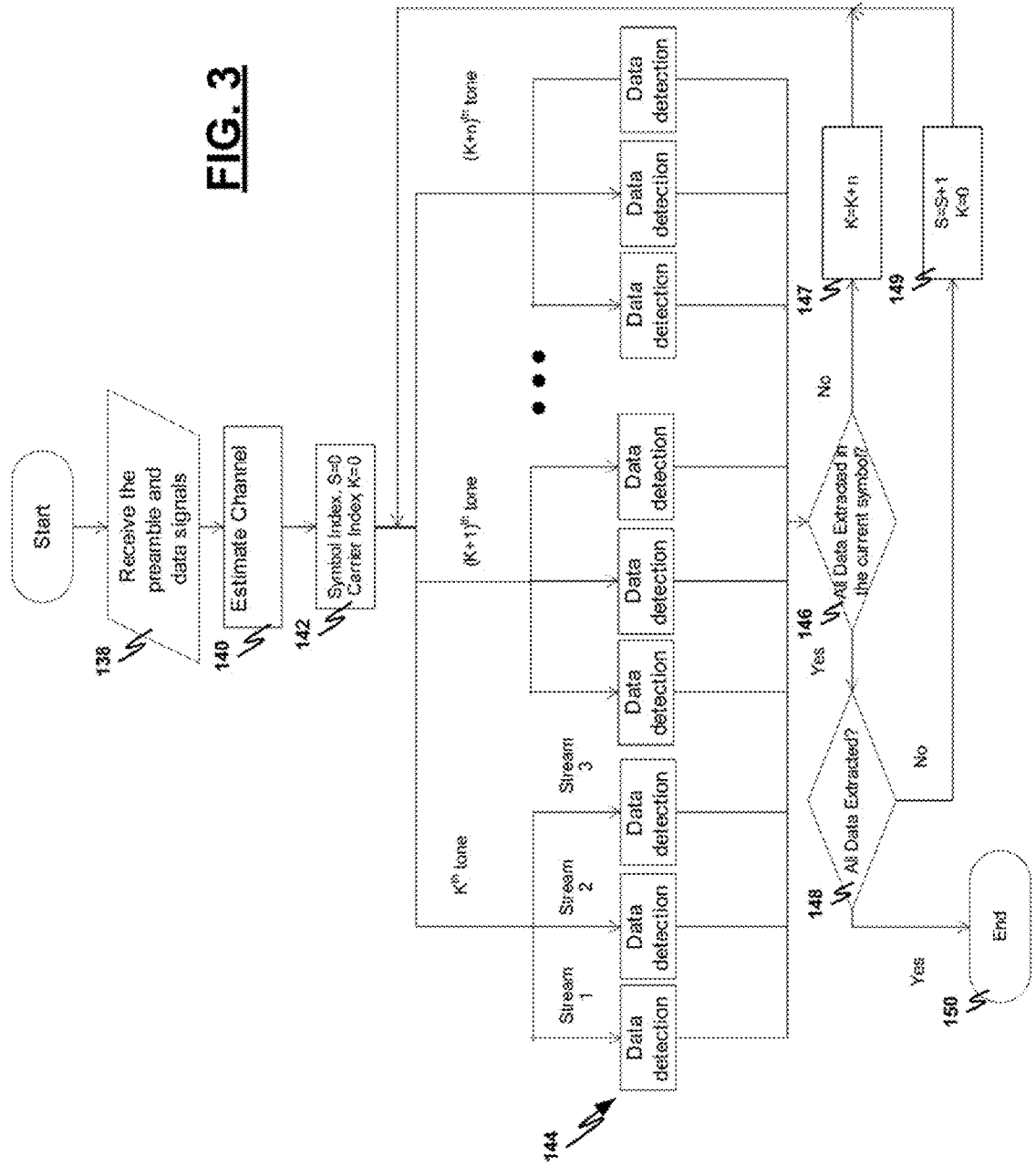

SYSTEMS AND METHODS FOR DETECTING DATA IN A RECEIVED MULTIPLE-INPUT-MULTIPLE-OUTPUT (MIMO) SIGNAL

CROSS-REFERENCE TO RELATED APPLICATIONS

This disclosure claims priority to U.S. Provisional Patent Application No. 62/244,335, filed on Oct. 21, 2015, the entirety of which is incorporated herein by reference.

TECHNICAL FIELD

The technology described in this document relates generally to signal receivers and more particularly to systems and methods for selecting a data detection technique for a multiple-input-multiple-output (MIMO) system.

BACKGROUND

In the field of wireless communications, MIMO-OFDM (Multiple-Input and Multiple-Output, Orthogonal Frequency-Division Multiplexing) technology has been used to achieve increased data throughput and link range without requiring additional bandwidth or increased transmission power. MIMO-OFDM technology utilizes multiple transmission antennas at a transmitter and multiple receiving antennas at a receiver to enable a multipath rich environment with multiple orthogonal channels existing between the transmitter and the receiver. Data signals are transmitted in parallel over these channels, and as a result, both data throughput and link range are increased. Due to these advantages, MIMO-OFDM has been adopted in various wireless communication standards, such as IEEE 802.11n/11ac, 4G, 3GPP Long Term Evolution (LIE), WiMAX, and HSPA+.

SUMMARY

The present disclosure is directed to systems and methods for detecting data in a received multiple-input-multiple-output (MIMO) signal. In an example method for detecting data in a received MIMO signal N signals are received from N respective antennas, where the received signals are associated with (i) M sets of data values, (ii) a set of symbols, and (iii) a set of carrier frequencies. The M signals are received via a transmission channel. The N signals are formed into a received signal vector y, and one or more transformations are performed on the received signal vector y to obtain a transformed vector. A plurality of samples are formed from the transformed vector, where each sample of the plurality of samples is associated with (i) a spatial stream, of a set of spatial streams, (ii) a symbol of the set of symbols, and (iii) a carrier frequency of the set of carrier frequencies. For samples of the plurality of samples, a data detection technique of a plurality of data detection techniques to be used in detecting data of a given sample is selected. The selecting is based on at least one of the spatial stream, the symbol, and the carrier frequency associated with the given sample. The selected data detection technique is used to detect data of the given sample.

An example communication system for detecting data in a received MIMO signal comprises N antennas configured to receive, via a transmission channel, N respective signals. The received signals are associated with (i) M sets of data values, (ii) a set of symbols, and (iii) a set of earner frequencies. The communication device also includes one or more integrated circuit (IC) devices configured to implement a plurality of data detection techniques. The one or more IC devices are configured to form the N signals into a received signal vector y and perform one or more transformations on the received signal vector y to obtain a transformed vector. The one or more IC devices are also configured to form a plurality of samples from the transformed vector. Each sample of the plurality of samples is associated with (i) a spatial stream of a set of spatial streams, (ii) a symbol of the set of symbols, and (iii) a carrier frequency of the set of carrier frequencies. The one or more IC devices are father configured to select, for samples of the plurality of samples, a data detection technique of the plurality of data detection techniques to be used in detecting data of a given sample. The selecting is based on at least one of the spatial stream, the symbol, and the carrier frequency associated with the given sample.

In another example method for detecting data in a received signal, N signals are received from N respective antennas, where the received signals are associated with M sets of data values and a set of symbols. The N signals are formed into a received signal vector y, and one or more transformations are performed on the received signal vector y to obtain a transformed vector. A plurality of samples are formed from the transformed vector. Each sample of the plurality of samples is associated with (i) a spatial stream of a set of spatial streams, and (ii) a symbol of the set of symbols. For samples of the plurality of samples, a data detection technique of a plurality of data detection techniques to be used in detecting data of a given sample is selected. The selecting is based on at least one of the spatial stream and the symbol associated with the given sample. The selected data detection technique is used to detect data of the given sample.

BRIEF DESCRIPTION OF THE FIGURES

FIGS. 2A, 2B, and 2C illustrate example techniques for selecting a data detection technique of a plurality of data detection techniques implemented in a communication device.

FIG. 3 is a flowchart illustrating operations of an example method for selecting data detection schemes of a plurality of data detection schemes in a communication device.

DETAILED DESCRIPTION

Figure 1:
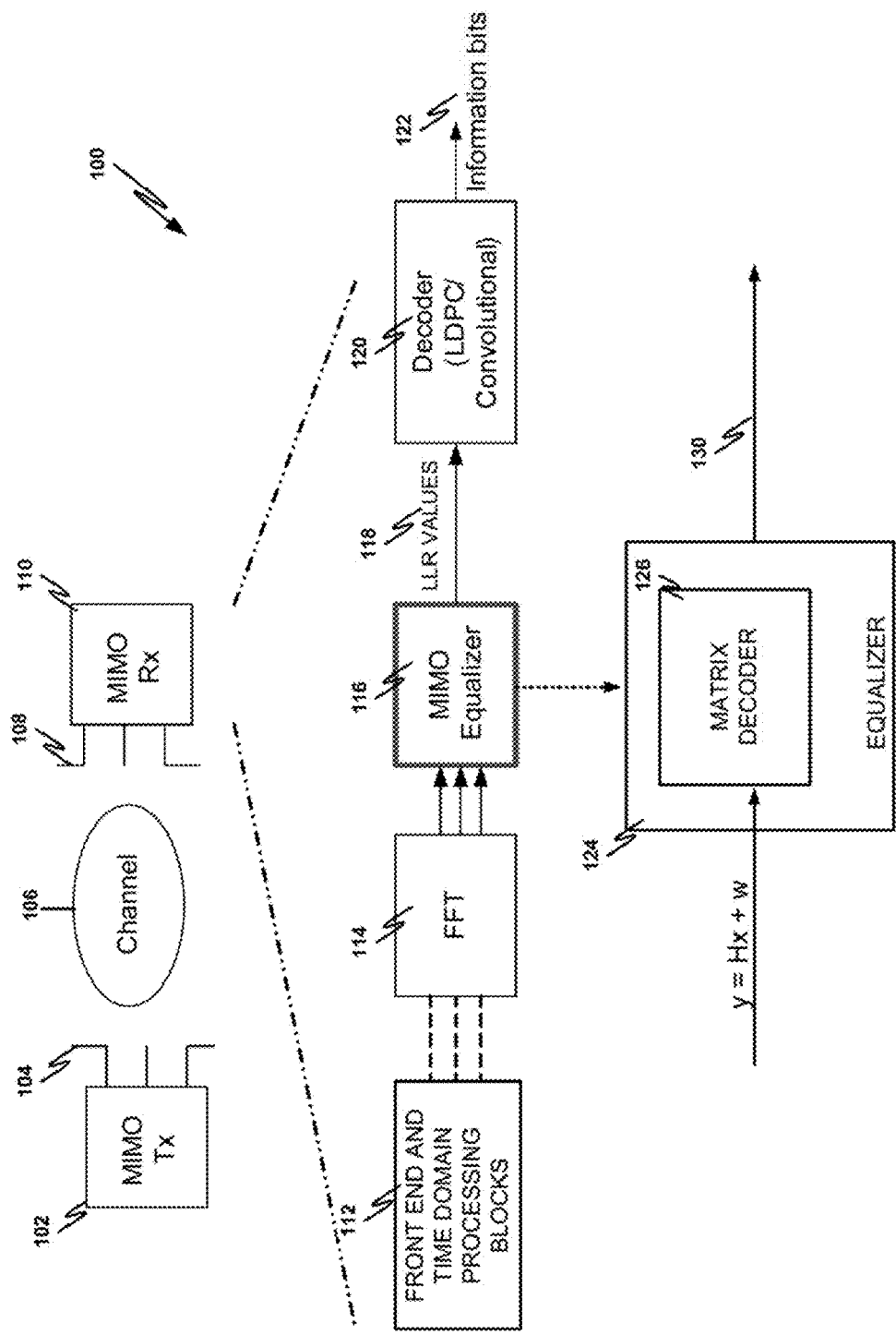
FIG. 1 is a block diagram of an example multiple-input-multiple-output (MIMO) communication system including a MIMO transmitter, MIMO receiver, and channel.

FIG. 1 is a block diagram 100 of an example multiple-input-multiple-output (MIMO) communication system including a MIMO transmitter 102, MIMO receiver 110, and channel 106. The MIMO communication system allows more than one spatial stream to be transmitted, and in the example of FIG. 1, three spatial streams are used. It is noted that the systems and methods described herein are not limited to scenarios where three spatial streams are used. For instance, in embodiments, the systems and methods described herein are used in systems with two spatial streams and/or a number of spatial streams that is greater than or equal to three. In the MIMO transmitter 102, data to be transmitted is provided as a stream of 1's and 0's to an encoder. The encoder encodes the data to be transmitted with, for example, an error correcting code. The output of the encoder is provided to a spatial stream splitter and divided into spatial streams (e.g., three spatial streams in the example of FIG. 1). These spatial streams are then propagated to a frequency modulator and frequency modulated into symbols, which may be represented as a sequence of complex numbers. The frequency modulated signals are then sent through three antennas 104 and transmitted through the transmission channel 106. The transmission channel 106 may include, for example, air. In other examples, fewer than three antennas are used, or more than three antennas are used.

In the example illustrated in FIG. 1, using three antennas 108, the MIMO receiver 110 receives the three signals from the transmission channel 106. In the MIMO receiver 110, the received signals are processed by front end and time domain processing blocks 112 (e.g., analog-to-digital conversion blocks, digital to analog-conversion blocks, etc.). The output of the front end and time domain processing blocks 112 is provided to a fast Fourier Transform (FFT) module 114 and converted from a time domain representation to a frequency domain representation. The converted signals are then propagated to a MIMO equalizer 116. The MIMO equalizer 116 then calculates log-likelihood ratio (LLR) values 118 for each of the received spatial steams. The MIMO equalizer 116 operates in the frequency domain and is configured to remove the channel effects on the received spatial streams. The calculated LLR values 118 are combined by a LLR combiner and provided to a decoder 120. The decoder 120 may be, for example, a low-density parity-check (LDPC) decoder or a convolutional decoder. The decoder 120 decodes the received spatial streams using the LLR values provided by the combiner and generates informational bits output data 122.

The MIMO equalizer 116 utilizes a matrix decoder 126 to perform distance and LLR calculations. As described below, in some embodiments, the MIMO equalizer 116 is configured to advantageously employ multiple different data detection techniques to detect data in received signals. The use of the multiple different detection schemes enables the MIMO equalizer 116 to balance computational complexity and performance (e.g., detection accuracy), as described in further detail below. In some embodiments, in detecting data of received signals, the MIMO equalizer 116 is configured to select two or more data detection techniques from a plurality of data detection techniques.

The plurality of data detection techniques include, in some embodiments, a "3ML (maximum-likelihood)" data detection technique, a "2ML" data detection technique, a "zero-forcing, maximum-likelihood" (ZF-ML) data detection technique, and a zero-forcing (ZF) data detection technique. As described below, in some embodiments, the 2ML and ZF-ML data detection techniques are implemented using a subset of the equalizer modules of the 3ML data detection technique. The 3ML data detection technique is described below with reference to FIGS. 6 and 7. The 2ML data detection technique is implemented, in some embodiments, by disabling (e.g., turning off) one or more equalizer modules used in the 3ML data detection technique, and this is described below with reference to FIGS. 6 and 7. The ZF-ML data detection technique is implemented, in some embodiments, by (i) modifying operations performed by one or more of the 3ML equalizer modules, and (ii) performing pre-processing to modify one or more inputs to the 3ML equalizer modules. The ZF-ML data detection technique is described below with reference to FIGS. 8A-8C and 9. The ZF data detection technique is a conventional data detection technique that is known to those of ordinary skill in the art. The ZF data detection technique is described, for instance, in U.S. Pat. No. 8,094,744, the entirety of which is incorporated herein by reference.

The 3ML data detection technique generally provides a highest performance (e.g., a highest detection accuracy) but has a relatively high computational complexity. Rather than only utilizing the 3ML data detection technique, the techniques of the present disclosure enable dynamic switching between multiple different data detection techniques (e.g., 3ML, ZF-ML, 2ML, and ZF data detection techniques, etc.). By utilizing the multiple different data detection algorithms, the techniques of the present disclosure enable a lower power consumption as compared to techniques that only use the 3ML algorithm.

In embodiments, the lower power consumption provided by the techniques of the present disclosure comes at a cost of reduced performance (e.g., reduced detection accuracy, etc.). Specifically, although the ZF-ML, 2ML, and ZF techniques offer a lower power consumption than the 3ML technique, these techniques also have a lower performance than the 3ML technique in some instances. Thus, for example, an accuracy of data detection provided by the ZF-ML, 2ML, and ZF techniques may be lower than that of the 3ML technique in some instances. As an example, when a signal-to-interference ratio (SIR) or signal-to-noise ratio (SNR) of a signal is relatively low the signal is relatively weak), the 3ML technique may provide more accurate data detection than the ZF-ML, 2ML, and ZF techniques. Accordingly, the use of the multiple different data detection techniques described herein provides a balance between computational complexity and performance in some embodiments.

As an example of the techniques described herein, consider a communication device that receives signals via multiple different spatial streams. The communication device is configured, in some embodiments, to detect data of the multiple Spatial streams in parallel (e.g., simultaneously). According to an embodiment of the present disclosure, the communication device (i) detects data of a first spatial stream using the 3ML data detection technique, (ii) detects data of a second spatial stream using the 2ML data detection technique, and (iii) detects data of a third spatial stream using the ZF-ML data detection technique. Through the use of the multiple different data detection techniques, this embodiment enables a lower power consumption as compared to techniques that use the 3ML algorithm for all three spatial streams. In other embodiments described below, selection of data detection techniques based on other resources OFDM symbols in a time domain, carrier frequencies, etc.) is utilized. Further, in other embodiments described below, a data detection technique is selected based on a metric computed by the communication device, such as an SIR, an SNR, or an interference-to-noise ratio (INR).

With reference again to FIG. 1, the matrix decoder 126 receives, via the three antennas 108, a first signal, a second signal, and a third signal transmitted through the channel 106. The matrix decoder 126 utilizes multiple data detection techniques and computes LLR values based on the received signals. Specifically, the received first, second, and third signals may be represented by the equation y=Hx+n, where y represents the received signals at the MIMO receiver 110, x represents the data values of the symbols in the spatial streams transmitted by the MIMO transmitter 102, H is a channel matrix representing combined effects of the transmission channel 106 and spatial mapping of the MIMO transmitter 102 on the transmitted signal, and n represents noise. In the three spatial stream case, y is a 3×1 vector ($[y_1, y_2, y_3]^T$), x is a 3×1 vector ($[x_1, x_2, x_3]^T$), H is a 3×3 vector $$\begin{bmatrix} h_{11} & h_{12} & h_{13} \\ h_{21} & h_{22} & h_{23} \\ h_{31} & h_{32} & h_{33} \end{bmatrix},$$

and n is a 3×1 vector ($[n_1, n_2, n_3]^T$). Thus, a 3×3 MIMO system with the three spatial streams may be described by the following equation:

$$\underbrace{\begin{bmatrix} y_1 \\ y_2 \\ y_3 \end{bmatrix}}_{y} = \underbrace{\begin{bmatrix} h_{11} & h_{12} & h_{13} \\ h_{21} & h_{22} & h_{23} \\ h_{31} & h_{32} & h_{33} \end{bmatrix}}_{H} \underbrace{\begin{bmatrix} x_1 \\ x_2 \\ x_3 \end{bmatrix}}_{x} + \underbrace{\begin{bmatrix} n_1 \\ n_2 \\ n_3 \end{bmatrix}}_{n}.$$

Assuming an additive white Gaussian noise (AWGN) model and perfect channel estimation, the equalizer 124 seeks optimal estimates of symbols $x_1$, $x_2$, and $x_3$ so as to minimize a Euclidian distance:

$$\|y - Hx\|^2 = \sum_{i=1}^{3} |y_i - h_{i1}x_1 - h_{i2}x_2 - h_{i3}x_3|^2.$$

The selection of optimal estimates of the symbols to minimize the Euclidian distance is described below and is performed using multiple different data detection techniques (e.g., 3ML, ZF-ML, 2ML, and ZF techniques, etc.).

The techniques of the present disclosure enable a communication device to switch between multiple different data detection techniques, thus providing a balance between computational complexity power consumed) and performance. In MIMO-OFDM systems, a communication device (e.g., a receiver, a transceiver, etc.) is configured to receive, via a transmission system, N signals from N respective antennas. The received signals are associated with (i) M sets of data values, (ii) a set of symbols, and (iii) a set of carrier frequencies. In some embodiments, M is equal to a number of spatial streams used in the MIMO-OFDM system. For instance, in a MIMO-OFDM system utilizing three spatial streams, the received signals are associated with M=3 sets of data values. In some embodiments, the N signals are formed into a received signal vector y, and the M sets of data values are formed into a vector x. Examples of the vector y and the vector x are described above and in further detail below.

In some embodiments, the communication device is configured to estimate a channel matrix H representing effects of the transmission channel on the M sets of data values. Further, the communication device is configured to perform a QR decomposition of the channel matrix H, in some embodiments, such that H=QR, where Q matrix is a unitary matrix and R matrix is an upper triangular matrix. The communication device is also configured to perform one or more transformations on the received signal vector y to obtain a transformed vector. The QR decomposition and the transforming of the received signal vector y are explained in further detail below. In some embodiments described below, the transforming comprises transforming the received signal vector y into a rotated signal vector z according to $z=Q^H y$. The communication device is also configured to form a plurality of samples from the transformed vector, where each sample of the plurality of samples is associated with (i) a spatial stream of a set of spatial streams, (ii) a symbol of the set of symbols, and (iii) a carrier frequency of the set of carrier frequencies.

The communication device is configured to select, for samples of the plurality of samples, a data detection technique of a plurality of data detection techniques to be used in detecting data of a given sample. In some embodiments of the present disclosure, the selecting is based on at least one of the spatial stream, the symbol, and the carrier frequency associated with the given sample. For instance, in an embodiment, the communication device selects a first data detection technique (e.g., the 3ML data detection technique) for detecting data, of samples associated with a first spatial stream, a second data detection technique (e.g., the 2ML data detection technique) for detecting data of samples associated with a second spatial stream, and a third data detection technique (e.g., the ZF-ML data detection technique or the ZF data detection technique, etc.) for detecting data of samples associated with a third spatial stream.

Likewise, in another embodiment, the communication device selects a first data detection technique for detecting data of samples associated with a first OFDM symbol (e.g., samples associated with a first OFDM symbol index), a second data detection technique for detecting data of samples associated with a second OFDM symbol samples associated with a second OFDM symbol index), and a third data detection technique for detecting data of samples associated with a third OFDM symbol (e.g., samples associated with a third OFDM symbol index). Similarly, in another embodiment, the communication device selects a first data detection technique for detecting data of samples associated with a first carrier frequency (e.g., samples associated with a first earner index), a second data detection technique for detecting data of samples associated with a second carrier frequency (e.g., samples associated with a second carrier index), and a third data detection technique for detecting data of samples associated with a third earner frequency (e.g., samples associated with a third earner index).

In some embodiments of the present disclosure, the communication device is configured to switch data detection techniques utilized for different streams, symbols, or earner frequencies in a cyclical manner. Consider an embodiment in which the communication device selects (i) the 3ML data detection technique for detecting date of a first spatial stream, (ii) the 2ML data detection technique for detecting data of a second spatial stream, and (iii) the ZF-ML data detection technique for detecting data of a third spatial stream. If this scheme is utilized at all times (e.g., for all symbols, for all carrier frequencies, etc.), data detection of the first spatial stream may have a higher accuracy than data detection of the second and third spatial streams as a result of the higher performance of the 3ML algorithm as compared to the 2ML and ZF-ML algorithms. This may be undesirable. Accordingly, in embodiments of tire present disclosure, the above-mentioned cyclical switching techniques are used to eliminate or mitigate this undesirable condition.

In the above example, for instance, during a first stage (e.g., a first time period, a first iteration, a first OFDM symbol, a first carrier frequency, etc.), the communication device selects (i) the 3ML data detection technique for detecting data of a first spatial stream, (ii) the 2ML data detection technique for detecting data of a second spatial stream, and (iii) the ZF-ML data detection technique for detecting data of a third spatial stream. In a second stage (e.g., a second time period, a second iteration, a second OFDM symbol, a second carrier frequency, etc.), the communication device selects (i) the ZF-ML data detection technique for detecting data of a first spatial stream, (ii) the 3ML data detection technique for detecting data of a second spatial stream, and (iii) the 2ML data detection technique for detecting data of a third spatial stream. In a third stage (e.g., a third time period, a third iteration, a third OFDM symbol, a third carrier frequency, etc.), the communication device selects (i) the 2ML data detection technique for detecting data of a first spatial stream, (ii) the ZF-ML data detection technique for detecting data of a second spatial stream, and (iii) the 3ML data detection technique for detecting data of a third spatial stream. Thus, in this example, use of the 3ML data detection technique is balanced across the three spatial streams, which may help to ensure that data detection accuracy is approximately equal for the three spatial streams. In embodiments where data detection techniques are selected on the basis of an OFDM symbol index or a carrier frequency index, cyclical switching techniques can be used in a similar manner to ensure that data detection accuracy is approximately equal across multiple OFDM symbols or multiple earner frequencies.

In the embodiments described above, the communication device selects a data detection technique based on a single resource (e.g., the data detection technique for a sample is selected based on a spatial stream, OFDM symbol, or carrier frequency associated with the sample). In other embodiments, the communication device selects a data detection technique for a given sample based on two or more resources associated with the given sample. To illustrate these other embodiments, reference is made to FIGS. 2A-2C.

FIG. 2A illustrates a scheme implemented by the communication device in some embodiments. In this figure, rows of the table are associated with different OFDM symbols (e.g., different OFDM symbol indices), and columns of the table are associated with different spatial streams. In this example scheme, entries of the table have values of "1" or "0," where the value "1" represents a first data detection technique (e.g., the 3ML data detection technique, etc.) and the value "0" represents a second data detection technique (e.g., one of the ZF-ML, 2ML, or ZF data detection techniques, etc.). Using the scheme of FIG. 2A, the communication device selects a data detection technique for a given sample based on two resources, i.e., (i) the OFDM symbol associated with the given sample, and (ii) the spatial stream associated with the given sample. Thus, for instance, for a sample that is associated with a first OFDM symbol ("Symbol 1") and a first spatial stream ("Stream 1"), the communication device uses the first data detection technique, as indicated by the value "1" at this entry of the table. By contrast, for a sample that is associated with a second OFDM symbol ("Symbol 2") and the first spatial stream ("Stream 1"), the communication device uses the second data detection technique, as indicated by the value "0" at this entry of the table.

FIG. 2B illustrates another scheme implemented by the communication device in some embodiments. In this figure, rows of the table are associated with different OFDM symbols (e.g., different symbol indices), and columns of the table are associated with different carrier frequencies (e.g., different carrier indices). As in FIG. 2A, entries of the table have values of "1" or "0," where the value "1" represents a first data detection technique and the value "0" represents a second data detection technique. By implementing the scheme of FIG. 2B, the communication device selects a data detection technique for a given sample based on two resources, i.e., (i) the OFDM symbol associated with the given sample, and (ii) the carrier frequency associated with the given sample. In the scheme of FIG. 20, rows of the table are associated with different spatial streams, and columns of the table are associated with different carrier frequencies. By implementing the example scheme of FIG. 2C, the communication device selects a data detection technique for a given sample based on two resources, i.e., (i) the spatial stream associated with the given sample, and (ii) the carrier frequency associated with the given sample.

It is noted that the schemes illustrated in FIGS. 2A-2C are only examples. Other schemes implemented by the communication device provide switching of data detection techniques over different numbers of OFDM symbol indices, carrier frequency indices, and spatial streams. For instance, although the example of FIG. 2A provides switching over OFDM symbols 1, 2 and 3, in other examples, switching is provided over a number of OFDM symbols that is greater than three. It is further noted, for instance, that in some embodiments, the scheme of FIG. 2A is repeated for every three OFDM symbols. For example, the first row of FIG. 2A can be used for OFDM symbols having symbol indices 1, 4, 7, . . . , such that the "100" switching sequence of this row is repeated every three OFDM symbols. Likewise, the second row of FIG. 2A can be used for OFDM symbols having symbol indices 2, 5, 8 . . . , and the third row of FIG. 2A can be used for OFDM symbols having symbol indices 3, 6, 9, . . . . Similar repeating sequences can be used for the examples of FIGS. 2B and 2C.

Similarly, although the example of FIG. 2C provides switching over three spatial streams and three carrier frequencies, in other examples, switching is provided over numbers of spatial streams and carrier frequencies that are greater than three. Further, although the example of FIGS. 2A-2C implements a binary system, where a data detection technique is selected from a first data detection technique and a second data detection technique, in other examples, the communication device selects from a number of techniques that is greater than two. For instance, in some embodiments, the communication device selects a data detection technique from a set of data detection techniques that includes the 3ML, 2ML, ZF-ML, and ZF data detection techniques, among others. In some embodiments, rather than using binary values (e.g., as are used in FIGS. 2A-2C), values of another number system (e.g., hexadecimal, decimal, etc.) are used to indicate a data detection technique to be selected.

In the embodiments described above, the communication device selects a data detection technique for a given sample based on one or two resources. In other embodiments, the communication device selects a data detection technique for a given sample based on three resources associated with the given sample (e.g., spatial stream, OFDM symbol, and carrier frequency associated with the given sample). It is thus noted that according to the techniques of the present disclosure, selection of data detection techniques can be performed across one resource or multiple resources, i.e., one or more of the resources OFDM symbol (e.g., time), carrier frequency (e.g., tone), and spatial stream.

In some embodiments, the selection of a data detection technique for a given sample is based on an SIR, SNR, INR, and/or other metric. Specifically, in some embodiments, the communication device is configured to compute the SIR, SNR, INR, or other metric associated with a given sample. The communication device is further configured to compare the computed SIR, SNR, INR, or other metric to one or more thresholds and select a data detection technique for the given sample based on the comparisons). For instance, in some embodiments, based on a determination that the computed SIR or SNR is greater than or equal to the threshold, the communication device is configured to select a first data detection technique (e.g., one of the 2ML, ZF-ML, or ZF data detection techniques, for instance) that has a relatively low computational complexity and/or a relatively low performance. When the SIR or SNR is greater than or equal to the threshold, this indicates a relatively strong signal, and the first data detection technique may be adequate to detect data of the signal, despite its relatively low performance.

By contrast, based on a determination that the computed SIR or SNR is less than the threshold, the communication device is configured to select a second data detection technique (e.g., the 3ML data detection technique, for instance) that has a relatively high computational complexity and/or a relatively high performance. When the SIR or SNR is less than the threshold, this indicates a relatively weak signal. Accordingly, use of the first data detection technique having the relatively low performance may be inadequate for detecting data of the weak signal, such that the second data detection technique is selected by the communication device.

FIG. 3 is a flowchart illustrating operations of an example method for selecting data detection schemes of a plurality of data detection schemes in a communication device, in accordance with an embodiment of the present disclosure. At 138, a packet preamble and data signals are received at the communication device via a transmission channel. In embodiments, the communication device is a receiver, transceiver, or other such device, and the data signals include data to be detected. At 140, the transmission channel is estimated (e.g., from a VHT-LTF field, in embodiments). In some embodiments, the estimation of the transmission channel includes estimating a channel matrix H that represents effects of the transmission channel on transmitted data.

At 142, a symbol index S is set equal to zero, and a carrier index K is set equal to zero. The symbol index S for a sample corresponds to an OFDM symbol associated with the sample, and the carrier index K for the sample corresponds to a carrier frequency associated with the sample. As described above, in the techniques of the present disclosure, the communication device is configured to perform, the following steps, among others: (i) receiving N signals from N respective antennas, (ii) forming the N signals into a received signal vector y, (iii) performing one or more transformations on the received signal vector y to obtain a transformed vector, and (iv) forming a plurality of samples from the transformed vector, where each sample of the plurality of samples is associated with a spatial stream, an OFDM symbol of a set of OFDM symbols, and a carrier frequency of a set of carrier frequencies. Accordingly, the symbol index S for a sample denotes the OFDM symbol of the set of OFDM symbol s associated with the sample, and the symbol index K for the sample denotes the carrier frequency of the set of carrier frequencies associated with the sample.

After the step 142, the flowchart includes branches for respective tones, i.e., carrier frequencies. Thus, after setting K=0 in the step 142, a first branch corresponds to the Kth tone (i.e., carrier frequency index K=0), a second branch corresponds to the (K+1)th tone (i.e., carrier frequency index K=1), and so on. The example of FIG. 3 is for a three-stream system, and thus, each branch includes three data detection blocks 144. In each of the data detection blocks 144, data detection is performed for a given sample that is associated with (i) an OFDM symbol of the set of OFDM symbols (e.g., as indicated by the symbol index S for the given sample), (ii) a carrier frequency of the set of carrier frequencies (e.g., as indicated by the carrier index K for the given sample), and (iii) a spatial stream of the set of spatial streams (e.g., a spatial stream over which the given sample was received).

Figure 4:
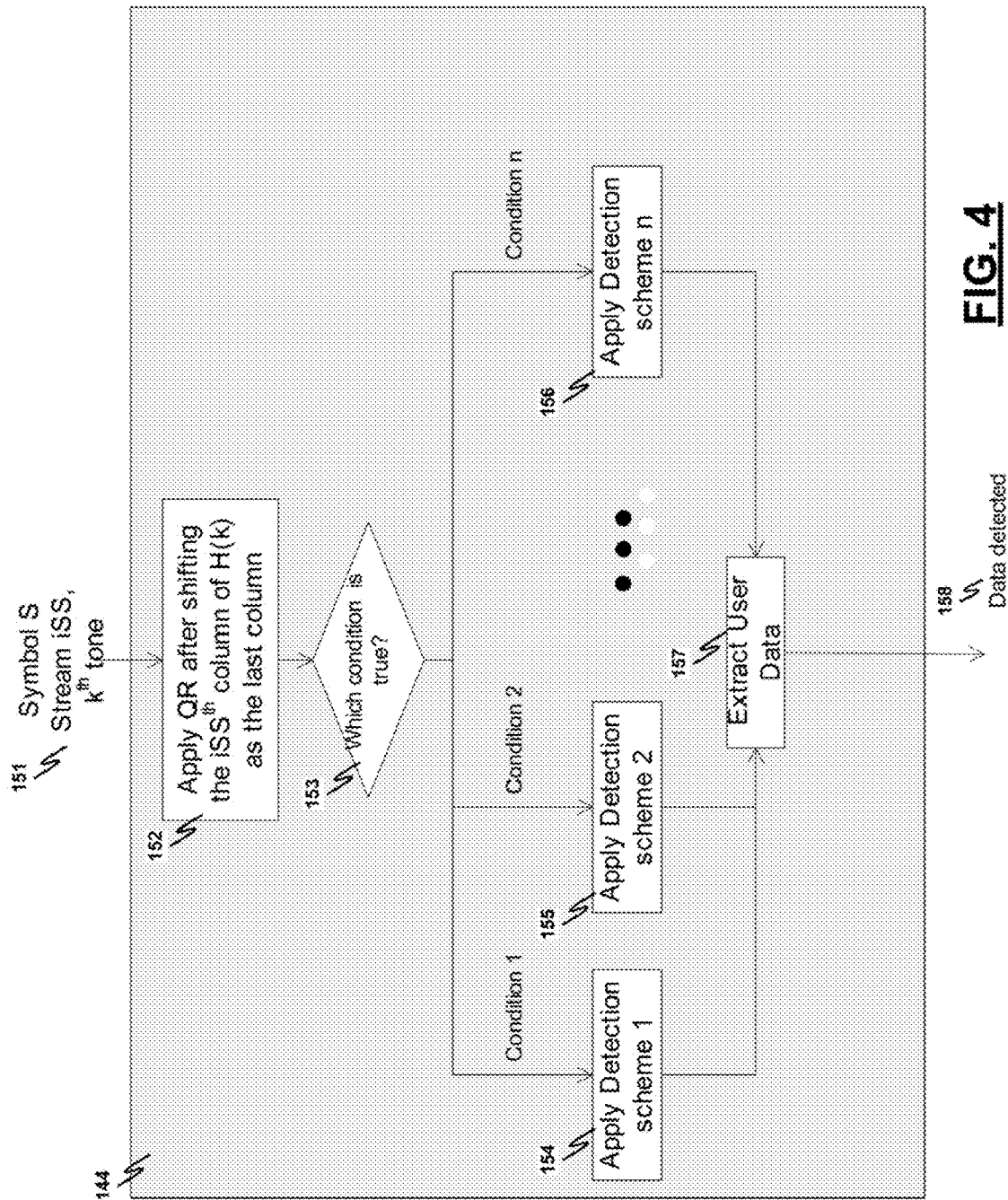
FIG. 4 illustrates example operations performed by a data detection module of a communication device, in accordance with one or more embodiments of the present disclosure.

To illustrate operations of the data detection blocks 144, reference is made to FIG. 4. This figure illustrates example operations performed by a data detection block of a communication device, in accordance with one or more embodiments of the present disclosure. As described above, the data detection block 144 performs data detection for a sample associated with three variables: symbol index S (i.e., representing the OFDM symbol associated with the sample), carrier index K (i.e., representing the carrier frequency or tone associated with the sample), and spatial stream iSS (i.e., representing the spatial stream associated with the sample). These variables are shown at 151 in FIG. 4. At 152, a QR decomposition is performed on the estimated channel matrix H(k) after shifting the iSS-th column of the channel matrix H(k) to the last column.

At 153, the data detection block 144 determines which condition of a plurality of conditions is true, and at 154, 155, 156, a data detection technique is selected based on the condition determined to be true. The selected data detection technique is used at 157 to extract data 158 from the sample. The determination made at the step 153 varies in different embodiments. In some embodiments, the determination at 153 is made based on the SIR, SNR, or INR of the sample under consideration. For instance, the SIR or SNR of the sample is compared to one or more thresholds, and based on these comparisons), a condition is determined to be true, and a corresponding data detection scheme is selected at 154, 155, or 156.

As described above, for example, if the SIR or SNR is determined to be relatively low, this may indicate that a relatively high complexity, high performance data detection technique (e.g., the 3ML data detection technique, etc.) is best-suited for performing data detection. Accordingly, the determination at 153 and detection technique selection at 154, 155, or 156 may result in the selection of the high complexity, high performance data detection technique, in embodiments. By contrast, if the SIR or SNR is determined to be relatively high, this may indicate that a relatively low complexity, low performance data detection technique (e.g., the ZF-ML, 2ML, or ZF data detection technique, etc.) is well-suited for performing data detection. Accordingly, the determination at 153 and detection technique selection at 154, 155, or 156 may result in the selection of the low complexity, low performance data detection technique, in embodiments. Although embodiments described above reference the use of a single threshold. In some embodiments, multiple thresholds are used to enable selection among the different 3ML, ZF-ML, 2ML, and ZF data detection techniques.

In some embodiments, the determination made at the step 153 is made based on one or more of the variables symbol index S, carrier index K, and spatial stream iSS. For instance, in some embodiments, the determination is made based on a single variable (e.g., samples received via spatial stream iSS=1 cause a condition corresponding to the 3ML data detection technique to be true, samples received via spatial stream iSS=2 cause a condition corresponding to the ZF-ML data detection technique to be true, and samples received via spatial stream iSS=3 cause a condition corresponding to the 2ML data detection technique to be true, etc.). In other embodiments, the determination is made based on two or three of the variables S, K, and iSS. FIGS. 2A-2C illustrate examples where a data detection technique is selected based on two variables, and as explained above, in some examples, a data detection technique is selected based on three variables (e.g., all three of the variables S, K, and iSS).

In some embodiments, the determination made at the step 153 is based on a switching sequence that is repeated every third OFDM symbol. To illustrate an example of this, reference is made to FIG. 5. In this example, as shown at 131, OFDM symbols 1, 4, 7, . . . are associated with a switching sequence "4," OFDM symbols 2, 5, 8, . . . are associated with a switching sequence "2," and OFDM symbols 3, 6, 9, . . . are associated with a switching sequence "1." The switching sequence identifiers "4," "2," and "1" are decimal numbers that are converted to binary numbers, as shown at 132. Each of the binary numbers is indicative of a binary selection of a data detection scheme to be used for a particular combination of OFDM symbol and spatial stream.

To illustrate this, at 133, the binary numbers are placed in a table, with each row of the table corresponding to a group of OFDM symbols, and each column of the table corresponding to a spatial stream. Thus, in this example, for OFDM symbols 1, 4, 7, . . . , the number in the first column indicates that a first data detection technique (e.g., the 3ML data detection technique) should be selected for detecting data of the first spatial stream, and the number "0" in the second and third columns indicates that a second data detection technique (e.g., the ZF-ML, 2ML, or ZF data detection technique, etc.) should be selected for detecting data of the second and third spatial streams. For OFDM symbols 2, 5, 8, . . . , the number "1" in the second column indicates that the first data detection technique should be selected for detecting data of the second spatial stream, and the number "0" in the first and third columns indicates that the second data detection technique should be selected for detecting data of the first and third spatial streams. For OFDM symbols 3, 6, 9, . . . the number "1" in the third column indicates that the first data detection technique should be selected for detecting data of the third spatial stream, and tire number "0" in the first and second columns indicates that the second data detection technique should be selected for detecting data of the first and second spatial streams.

In examples, the switching sequences are chosen to provide a balance between computational complexity (e.g., power consumption) and performance. For instance, in the context of FIG. 5, consider an example where a value of "1" indicates that the 3ML data detection technique should be selected, and a value of "0" indicates that a lower complexity data detection technique the ZF-ML, 2ML, or ZF data detection technique, etc.) should be selected. A binary number of "111" for a set of OFDM symbols would, indicate that the 3ML data detection technique should be selected for all three spatial streams. The use of the "111" binary number may provide relatively high performance (e.g., relatively high accuracy), but it may cause a relatively high power consumption. Conversely, a binary number of "000" for a set of OFDM symbols would indicate that the lower complexity data detection technique should be selected for all three spatial streams. The use of the "000" binary number may have a relatively low power consumption, but it may provide relatively low performance (e.g., relatively low accuracy). Accordingly, in embodiments, the binary numbers used in the selection of data detection algorithms are chosen to provide a balance between computational complexity and performance.

Figure 5:
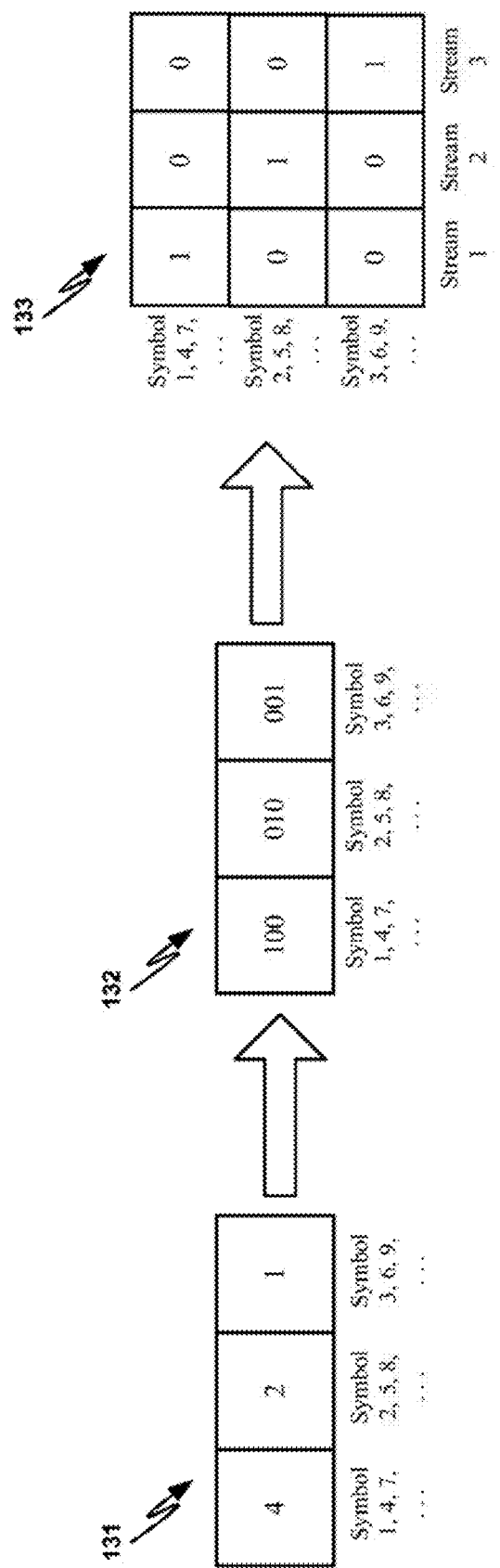
FIG. 5 illustrates example techniques for selecting a data detection technique of a plurality of data detection techniques implemented in a communication device.

It is noted that the embodiment of FIG. 5 is only an example. For instance, although the embodiment of FIG. 5 uses the above-described binary numbers, in other embodiments, a different number system (e.g., decimal, hexadecimal, etc.) enables selection from a set of more than two data detection techniques. Further, although the embodiment of FIG. 5 selects a data detection scheme based on the two variables (i) OFDM symbol, and (ii) spatial stream, in other embodiments, the selection of data detection scheme is based on other variables. For instance, in other embodiments, the data detection scheme is selected based on an OFDM symbol/carrier frequency combination or a carrier frequency/spatial stream combination. Further, as described herein, in embodiments, the data detection scheme is selected based on a single variable or based on all three variables (i.e., OFDM symbol (time), carrier frequency (tone), and spatial stream). Additionally, in some embodiments, a metric (e.g., SIR, SNR, INR, etc.) is computed and used in selecting the data detection scheme.

With reference again to FIG. 4, the data detection techniques applied at the respective blocks 154, 155, 156 include the aforementioned 3ML, ZF-ML, 2ML, and ZF data detection techniques described herein, in some embodiments. As described in further detail below, the use of the 3ML, ZF-ML, and 2ML data detection techniques is advantageous because all three of these data detection techniques can be implemented in a communication device with minimal area overhead. Specifically, as explained below, the ZF-ML and 2ML data detection techniques can be implemented using equalizer modules of the 3ML data detection technique (e.g., a subset of the equalizer modules of the 3ML technique), for example, by switching off certain equalizer modules, modifying operations performed by one or more equalizer modules, and performing pre-processing to modify inputs to the equalizer modules, etc. This enables the ZF-ML and 2ML data detection techniques to be implemented using the 3ML equalizer modules with only a minimal increase in hardware complexity. It is noted, however, that the systems and methods of the present disclosure are not limited to these particular data detection techniques and that other data detection techniques may be applied at the blocks 154, 155, 156.

With reference again to FIG. 3, at 146, it is determined whether all data has been extracted from the current OFDM symbol. If it is determined at 146 that not all data has been extracted from the current OFDM symbol, this indicates that data must be extracted for additional carrier frequencies tones). Accordingly, at 147, K is incremented (e.g., K=K+n), and the flowchart proceeds as shown in the figure to enable data detection to occur for a next set of carrier frequencies. If it is determined at 146 that all data has been extracted from the current OFDM symbol, the flowchart proceeds to 148. At 148, it is determined whether all data has been extracted (i.e., whether all data has been extracted for all OFDM symbols). If it is determined at 148 that not all data has been extracted, this indicates that data must be extracted for additional OFDM symbols. Accordingly, at 149, S is incremented (e.g., S=S+1), K is set equal to zero, and the flowchart proceeds as shown in the figure to enable data detection to occur for a next OFDM symbol. If it is determined at 148 that all data has been extracted, the flowchart proceeds to 150, and the process is complete. It is noted that at the completion of the flowchart of FIG. 3, data has been extracted (i) for all OFDM symbols of the set of OFDM symbols, (ii) for all carrier frequencies of the set of carrier frequencies, and (iii) for all spatial streams.

The embodiments described above are used in multiple-carrier systems, i.e., MIMO-OFDM symbols using multiple carrier frequencies. It is noted, however, that some embodiments of the present disclosure are used in the context of a single-carrier system. In the single carrier system, a single carrier frequency is used. In such embodiments, a communication device is configured to receive, via a transmission channel, N signals from N respective antennas, where the received signals are associated with M sets of data values and a set of symbols. The communication device is further configured to form the N signals into a received signal vector y and perform, one or more transformations on the received signal vector y to obtain a transformed vector. The communication device is configured to form a plurality of samples from the transformed vector, where each sample of the plurality of samples is associated with (i) a spatial stream of a set of spatial streams, and (ii) a symbol of the set of symbols. Accordingly, in the single-carrier system, it can be seen that the samples are associated with variables (symbols, stream). The communication device is configured to select, for samples of the plurality of samples, a data detection technique of a plurality of data detection techniques to be used in detecting data of a given sample. The selecting is based on at least one of the spatial stream and the symbol associated with the given sample. The selected data detection technique is used to detect data of the given sample.

The 3ML data detection technique is described below with reference to FIGS. 6 and 7. As described below, the 2ML and ZF-ML data detection techniques are implemented, in some embodiments, using a subset of the equalizer modules of the 3ML data detection technique. The 2ML and ZF-ML data detection techniques can thus be implemented using the 3ML equalizer modules with only a minimal increase in hardware complexity. Specifically, the 2ML data detection technique is implemented, in embodiments, by disabling (e.g., turning off) certain of the 3ML equalizer modules. This is described below with reference to FIGS. 6 and 7. The ZF-ML data detection technique is implemented, in embodiments, by (i) modifying operations performed by one or more of the 3ML equalizer modules, and (ii) performing pre-processing to modify inputs to the 3ML equalizer modules. The ZF-ML data detection technique is described below with reference to FIGS. 8A-8C and 9.

Figure 6:
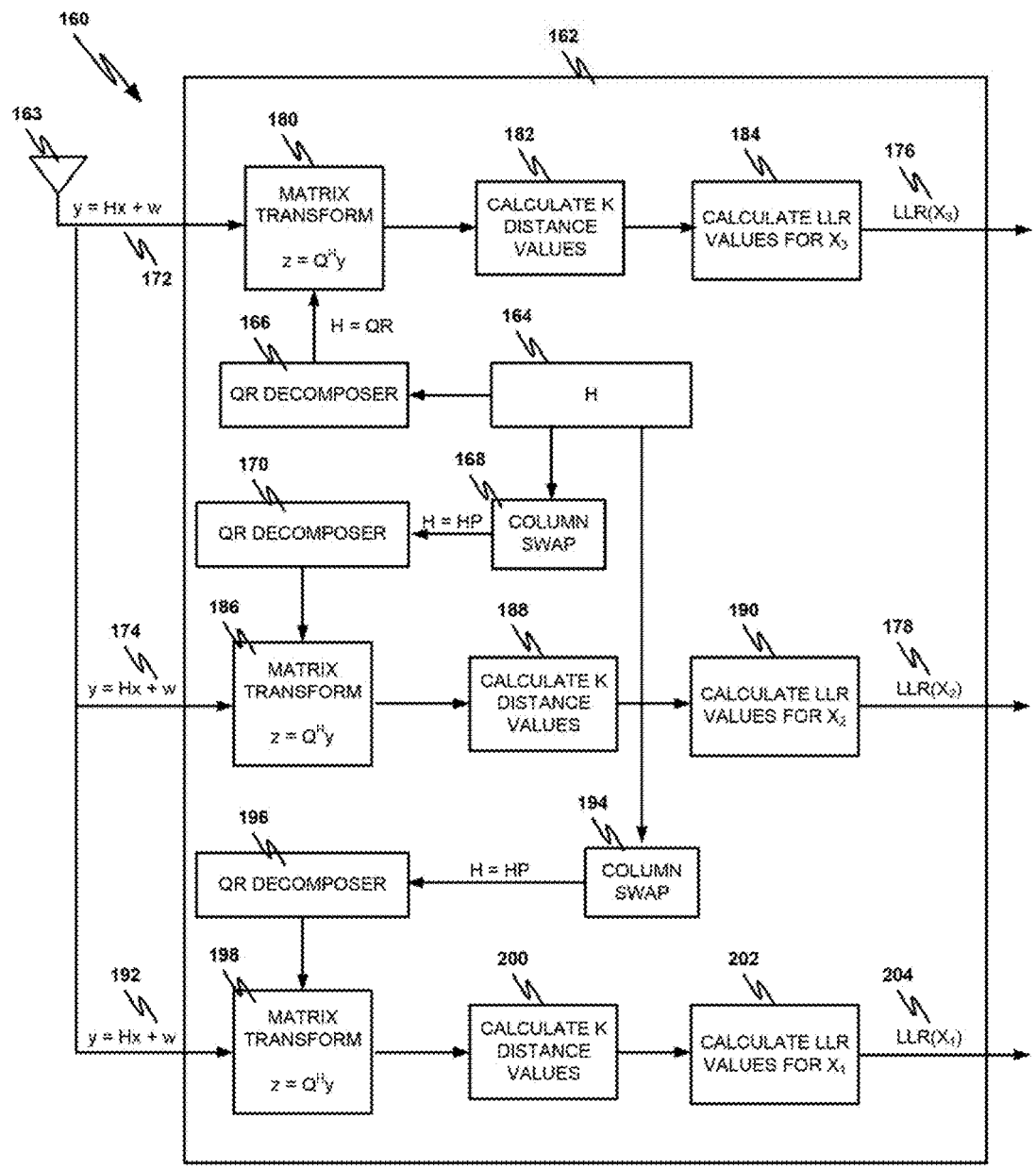
FIG. 6 is a block diagram illustrating internal components of an example matrix decoder for use in a communication device, where the example matrix decoder implements a 3ML algorithm for determining log-likelihood ratio ("LLR") values for three spatial streams.

FIG. 6 is a block diagram 160 illustrating internal components of an example matrix decoder 162 for use in a communication device, where the example matrix decoder implements the 3ML algorithm for determining LLR values for three spatial streams. Prior to receiving data signals over the one or more antennas 163, matrix calculations are done with respect to the estimated channel matrix H 164. As illustrated at 166, a QR decomposition of the H matrix 164 may be performed such that H=QR. The Q matrix is a unitary matrix, and the R matrix is an upper triangular matrix represented as $$R = \begin{bmatrix} r_{11} & r_{12} & r_{13} \\ 0 & r_{22} & r_{23} \\ 0 & 0 & r_{33} \end{bmatrix}.$$

A similar QR decomposition procedure is performed at 170, 196 using a permutated channel matrix, as described in greater detail below. At 168 and 194, the channel matrix H 164 is multiplied by a permutation matrix. In the current example including three spatial streams, the permutation matrices used at 168 and 194 may be, for example, $$P = \begin{bmatrix} 0 & 0 & 1 \\ 0 & 1 & 0 \\ 1 & 0 & 0 \end{bmatrix} \text{ or } P = \begin{bmatrix} 1 & 0 & 0 \\ 0 & 0 & 1 \\ 0 & 1 & 0 \end{bmatrix},$$

such that the columns of the channel matrix H are swapped when multiplied by the permutation matrix. In a modified version of the block diagram 160 of FIG. 6, rather than swapping columns of the H matrix 164, columns of the R matrix may be swapped.

The matrix decoder 162 executes over three paths 172, 174, 192 that may operate in series or in parallel. The first path 172 calculates LLR values 176 for data value associated with a third stream, the second path 174 calculates LLR values 178 for data value associated with a second stream, and the third path 192 calculates LLR values 204 for data value associated with a first stream. These LLR values 176, 178, 204 may be combined and decoded as described above with reference to FIG. 1.

The first path 172 begins at a matrix transformer 180. In the three spatial stream case, the matrix transformer 180 receives the first, second, and third signals as a 3×1 vector ($[y_1, y_2, y_3]^T$). The matrix transformer 180 transforms the y vector according to the relationship $z=Q^H y$, resulting in a 3×1 z vector ($[z_1, z_2, z_3]^T$). Specifically, in the matrix transformer 180, the relationship y=Hx+n may be multiplied by $Q^H$ to obtain $z=Q^H y=Rx+Q^H n$, which s expanded to $$\begin{bmatrix} z_1 \\ z_2 \\ z_3 \end{bmatrix} = \begin{bmatrix} r_{11} & r_{12} & r_{13} \\ 0 & r_{22} & r_{23} \\ 0 & 0 & r_{33} \end{bmatrix} \begin{bmatrix} x_1 \\ x_2 \\ x_3 \end{bmatrix} + \begin{bmatrix} n_1 \\ n_2 \\ n_3 \end{bmatrix}.$$

In the three spatial stream system, each data symbol transmitted, (where i=1 corresponds to data transmitted on a first spatial stream, i=2 corresponds to data transmitted on a second spatial stream, and i=3 corresponds to data transmitted on a third spatial stream) maps to n bits $\{b_1^{(i)}, b_2^{(i)}, \ldots, b_n^{(i)}\}$. $K=2^n$ is the alphabet size of the underlying modulation, such as binary phase shift keying (BPSK), quadrature amplitude modulation (QAM), etc.

Following the z transformation at 180, a minimum distance value is calculated at 182 for each of the K possible values of $x_3$. In a system using n=6 bits, the alphabet size K is equal to 64. The minimum distance calculated at 182 is calculated according to a formula:

$$\|z - Rx\|^2 = |z_1 - r_{11}x_1 - r_{12}x_2 - r_{13}x_3|^2 + \qquad \text{(Equation 1)}$$
$$|z_2 - r_{22}x_2 - r_{23}x_3|^2 +$$
$$|z_3 - r_{33}x_3|^2$$
$$= T_1 + T_2 + T_3$$

for each possible $x_3$ value. Specifically, $x_1$ and $x_1$ values that minimize the distance $T_1+T_2+T_3$ are determined for each possible $x_2$ value. It should be noted that the QR decomposition and z transformation procedure are of low computational complexities and do not change the statistical properties of the system. Thus, instead of minimizing the $\|y-Hx\|^2$ distance value, the less complex $\|z-Rx\|^2$ distance value can be minimized according to a sequential, "term-by-term" process described below. The term-by-term process is an algorithm that considers approximate versions of all three terms $T_1$, $T_2$, and $T_3$ attempts to minimize the sum $T_1+T_2+T_3$ with low computational complexity. The result is an approximate maximum likelihood solution that offers similar performance as compared to an exact maximum likelihood algorithm, while offering the lower computation complexity.

In determining the $x_1$ and $x_2$ values that minimize the distance $T_1+T_2+T_3$ for each possible $x_3$ value, a sequential, term-by-term process is employed. The term-by-term process for minimizing the distance is used instead of a process that attempts to minimize an entirety of the $T_1+T_2+T_3$ equation. In the term-by-term process, a first $x_3$ value is selected. For the first selected $x_3$ value, an $x_2$ value is calculated that minimizes the $T_2$ term of Equation 1. In other words, an $x_2$ value that minimizes the term $|z_2-r_{22}x_2-r_{23}x_3|^2$ is calculated for the first selected $x_3$ value. The $T_2$ term can be isolated and minimized in this manner because it is a function of only $x_2$ and $x_3$, where $x_3$ has been fixed to the first selected $x_3$ value. The $x_2$ value that minimizes the $T_2$ term may be determined via a slicing procedure, as described below.

Next, for the first selected $x_3$ value and the sliced $x_2$ value, an $x_1$ value is calculated that minimizes the $T_1$ term of Equation 1. In other words, an $x_1$ value that minimizes the term $|z_1-r_{11}x_1-r_{12}x_2-r_{13}x_3|^2$ is calculated for the first selected $x_3$ value and the sliced $x_2$ value. The $T_1$ term can be isolated and minimized in this manner because it is a function of $x_1$, $x_2$, and $x_3$, where $x_3$ is fixed and $x_2$ is the sliced $x_2$ value previously determined. The $x_1$ value that minimizes the $T_1$ term may be determined via a slicing procedure. In one example of the slicing procedures used to determine the $x_2$ and $x_1$ values that minimize the $T_2$ and $T_1$ terms, respectively, a coordinate value F is calculated, where F is a complex number. Following calculation of F, the distance calculator 182 quantizes F to a nearest constellation point. The nearest constellation point may be used to select the $x_2$ value that minimizes the $T_2$ term and the $x_1$ value that minimizes the $T_1$ term.

The term-by-term process for minimizing die distance $T_1+T_2+T_3$ is repeated for all possible $x_3$ values. In the system using n=6 bits, the alphabet size K is equal to 64, such that there are 64 possible $x_3$ values. Thus, in such a system with n=6 bits, the minimal distance for $T_1+T_2+T_3$ is repeated 64 times for each of the possible $x_3$ values. For each iteration, $x_2$ and $x_1$ values that minimize the $T_2$ and $T_1$ terms, respectively, are calculated, ultimately resulting in the calculation of $T_1+T_2+T_3$ distance values. When distance values for all possible values of are calculated, LLR values are calculated at 184 for the data associated with the third spatial stream, $x_3$. The calculated LLR values are output as shown at 176. The LLR value for a bit $b_k^{(i)}$ given a received vector y and a known channel matrix H may be represented as:

$$L(b_k^{(i)}) = \log\frac{P(b_k^{(i)}=1)}{P(b_k^{(i)}=0)} = \log\left\{\left(\sum_{x\in\chi_{k,i}} e^{-\|y-Hx\|^2/2\sigma^2}\right) \bigg/ \left(\sum_{x\in\bar{\chi}_{k,i}} e^{-\|y-Hx\|^2/2\sigma^2}\right)\right\},$$

where $\chi_{k,i}$ is the set of all possible x vectors with $b_k^{(i)}=1$, and $\bar{\chi}_{k,i}$ is the set of all possible x vectors with $b_k^{(i)}=0$. The following simplification, called the Max-Log Approximation, may also be utilized to calculate the LLR value for a bit $b_k^{(i)}$.

$$L(b_k^{(i)}) \approx \min_{x\in\chi_{k,j}} \|y-Hx\|^2 - \min_{x\in\bar{\chi}_{k,j}} \|y-Hx\|^2.$$

A similar process is followed along the second and first paths 174, 192 to calculate LLR values for data, associated with the second spatial stream ($x_2$) and the first spatial stream ($x_1$), respectively. At 168, the channel matrix H 164 is permutated to swap the second and third columns of the channel matrix H 164 prior to QR decomposition. Swapping the columns of H in this manner causes the value $x_2$ to be pushed down to the bottom of the x vector ($[x_1\ x_2\ x_3]^T$). Similarly, at 194, the channel matrix H 164 is permutated to swap the first and third columns of the channel matrix H 164 prior to QR decomposition. Swapping the columns of H in this manner causes the value $x_1$ to be pushed down to the bottom of the x vector ($[x_1\ x_2\ x_3]^T$). Following permutation of the channel matrix H 164 at 168 and 194, QR decompositions are performed at 170 and 196 on the permutated channel matrices. Mote that similar permutations can also be performed on the columns of R matrix from the QR at 170 or 196 and then perform QR of this permuted R matrix to obtain the LLR values of data associated with second and first spatial streams.

The second path 174 begins at a second matrix transformer 186. In the three spatial stream case, the matrix transformer 186 receives the first, second, and third spatial stream signals as a 3×1 vector ($[y_1\ y_2\ y_3]^T$). The second matrix transformer 186 transforms the received y vector according to the relationship $z=Q^H y$, resulting in a 3×1 z vector ($[z_1\ z_2\ z_3]^T$). Following the z transformation, at 186, a minimum distance value is calculated at 188 for each of the K possible values of $x_2$ in a similar manner as was described with respect to $x_3$ at 182. The minimum distance value calculated at 188 is calculated according to the formula:

$$\|z - Rx\|^2 = |z_1 - r_{11}x_1 - r_{12}x_3 - r_{13}x_2|^2 + \qquad \text{(Equation 2)}$$
$$|z_2 - r_{22}x_3 - r_{23}x_2|^2 + |z_3 - r_{33}x_2|^2$$
$$= T_1 + T_2 + T_3.$$

The term-by-term process for minimizing the distance $T_1+T_2+T_3$ of Equation 2 is utilized, and a first $x_2$ value is selected. For the first selected $x_2$ value, $x_3$ and $x_1$ values that minimize the $T_2$ and $T_1$ terms, respectively, are calculated, where the $x_3$ and $x_1$ values are calculated in the sequential, term-by-term process described above. The $x_3$ and $x_1$ values that minimize the $T_2$ and $T_1$ terms may be determined via a slicing procedure. The term-by-term process for minimizing the distance $T_1+T_2+T_3$ is repeated for all possible $x_2$ values, thus producing K $T_1+T_2+T_3$ distance values. When distance values for all possible values of $x_2$ are calculated, LLR values are calculated at 190 for the data associated with the second spatial stream, $x_2$. The calculated LLR values are output as shown at 178.

The third path 192 begins at a third matrix transformer 198. In the three spatial stream case, the matrix transformer 198 receives the first, second, and third spatial stream signals as a 3×1 vector ($[y_1\ y_2\ y_3]^T$). The third matrix transformer 198 transforms the received y vector according to the relationship $z=Q^H y$, resulting in a 3×1 z vector ($[z_1\ z_2\ z_3]^T$). Following the z transformation at 198, a minimum distance value is calculated at 200 for each of the K possible values of $x_1$ in a similar manner as was described with respect to $x_3$ and $x_2$. The minimum distance value calculated at 200 is calculated according to the formula:

$$\|z - Rx\|^2 = |z_1 - r_{11}x_2 - r_{12}x_3 - r_{13}x_1|^2 + \qquad \text{(Equation 3)}$$
$$|z_2 - r_{22}x_3 - r_{23}x_1|^2 + |z_3 - r_{33}x_1|^2$$
$$= T_1 + T_2 + T_3.$$

The term-by-term process for minimizing the distance $T_1+T_2+T_3$ of Equation 3 is utilized, and a first $x_1$ value is selected. For the first selected $x_1$ value, $x_2$ and $x_3$ values that minimize the $T_1$ and $T_2$ terms, respectively, are calculated, where the $x_2$ and $x_3$ values are calculated in the sequential, term-by-term process described above. The $x_2$ and $x_3$ values that minimize the $T_1$ and $T_2$ terms may be determined via a slicing procedure. The term-by-term process for minimizing the distance $T_1+T_2+T_3$ is repeated for all possible $x_1$ values, thus producing M $T_1+T_2+T_3$ distance values. When distance values for all possible values of $x_1$ are calculated, LLR values are calculated at 202 for the data associated with the first spatial stream, $x_1$. The calculated LLR values are output as shown at 204. The calculated LLR values 176, 178, 204 for the $x_3$, $x_2$, and $x_1$ spatial streams are passed to a decoder as soft information.

Certain approximations for metric computation may be used in the example of FIG. 6. For example, for fixed point hardware implementations, the distance approximations for the terms $T_1$, $T_2$, and $T_3$ may compute and store norm values instead of norm-square values. As an example, $|z_3-r_{33}x_3|$ may be computed instead of $|z_3-r_{33}x_3|$ for term $T_3$ of Equation 1. Further, various norm approximations may be used. For example, the 2-norm of complex number $a+ib$ is approximated as $$|a+ib| \cong \max\{|a|, |b|\} + \frac{5}{16}\min\{|a|, |b|\}.$$

The term-by-term process and slicing procedure utilized in the matrix decoder 162 of FIG. 6 generates an approximate maximum likelihood solution without significant loss to performance, as compared, to an exact maximum likelihood solution. The term-by-term process and slicing procedure has a lower complexity as compared to an exhaustive search or brute force methodology, potentially offering large savings in required hardware and computation time as well as higher throughput. The procedure balances complexity and performance and may result in a performance improvement in a rate-versus-range metric when using three spatial streams. Using the 3ML algorithm described, above, it may be possible to sustain higher throughputs for longer distances as compared to conventional solutions, and the performance gain may be most significant in over-the-air (OTA) scenarios.

Although the 3ML algorithm is described in terms of an example using three spatial streams, the techniques described above can be extended to systems having a number of spatial streams that is greater than three and offer such systems improved performance. Further, the approximation may be used to reduce a number of receiving antennas on a device, such that the performance of a conventional system having four receiving antennas may be provided with three receiving antennas when utilizing the above-described approximations. Additionally, as described above, the system may be carried out in a parallel form for reduced latency.

Variations of the above-described 3ML algorithm may be implemented. Such variants may modify the system of FIG. 6 to enable different balances between complexity and performance, for example. As an example, the 2ML data detection technique may utilize a $T_2+T_3$ distance equation, rather than the $T_1+T_2+T_3$ distance equation of Equations 1, 2, and 3, in the context of a MIMO system using three spatial streams. Using only terms $T_2+T_3$ may offer a lower computational complexity. The 2ML algorithm is derived from the 3ML algorithm, and in embodiments, the 2ML algorithm is implemented by disabling (e.g., turning off) one or more equalizer modules of the 3ML data detection technique. The disabling of equalizer modules to implement the 2ML data detection technique is described in further detail below with reference to FIG. 7.

As another example, a "3ML_2PT" variant may be used. In the 3ML_2PT variant, for each possible value of $x_3$ in the constellation, the two nearest sliced $x_2$ points are stored and used to determine two nearest sliced $x_1$ points. For example, for a given $x_3$ value, a sliced, $x_{21}$ value that minimizes the $T_2$ term may be used to determine a sliced $x_{11}$ value that attempts to minimize $T_1$, and a sliced $x_{22}$ value that minimizes the $T_2$ may be used to determine a sliced $x_{12}$ value that also attempts to minimize $T_1$. In this manner, the use of the multiple sliced $x_2$ points and the multiple sliced $x_1$ points may be used to better optimize the distance value $T_1+T_2+T_3$. With the two $x_2$ values and the two $x_1$ values, two sets of $T_1+T_2+T_3$ distance values are computed, and a lower of the two distance values can be used for further processing. The 3ML_2PT variant requires storage of the two sets of $T_1+T_2+T_3$ distance values and requires additional computations to obtain the additional $x_2$ and $x_1$ values.

As another example, a "3ML_4PT" variant is an extension of the 3ML_2PT variant. In the 3ML_4PT variant, for each possible value of $x_1$ in the constellation, the four nearest sliced $x_2$ points are stored and used to determine four nearest sliced $x_1$ points. The use of the four sliced $x_2$ points and the four sliced $x_1$ points may be used to better optimize the distance value $T_1+T_2+T_3$. With the four $x_1$ values and the four $x_1$ values, four sets of $T_1+T_2+T_3$ distance values are computed, and a lowest of the four distance values can be used for further processing. The 3ML_4PT variant requires storage of the four sets of $T_1+T_2+T_3$ values.

As yet another example, a "Mod_3ML" variant may be used. In the Mod_3ML variant, the procedures described above with reference to FIG. 6 may be performed twice. For example, in a first step, for each possible $x_2$ value in the constellation, slicing may be used to determine an optimal $x_2$ value, and then slicing may be used to determine an optimal $x_1$ value (i.e., as described above with reference to FIG. 6). In a second step, for each possible $x_2$ value in the constellation, slicing may be used to determine an optimal $x_1$ value, and then slicing may be used to determine an optimal $x_2$ value. The two steps produce two sets of $T_1+T_2+T_3$ distance values, and a minimum distance value may be selected and used in further processing.

Figure 7:
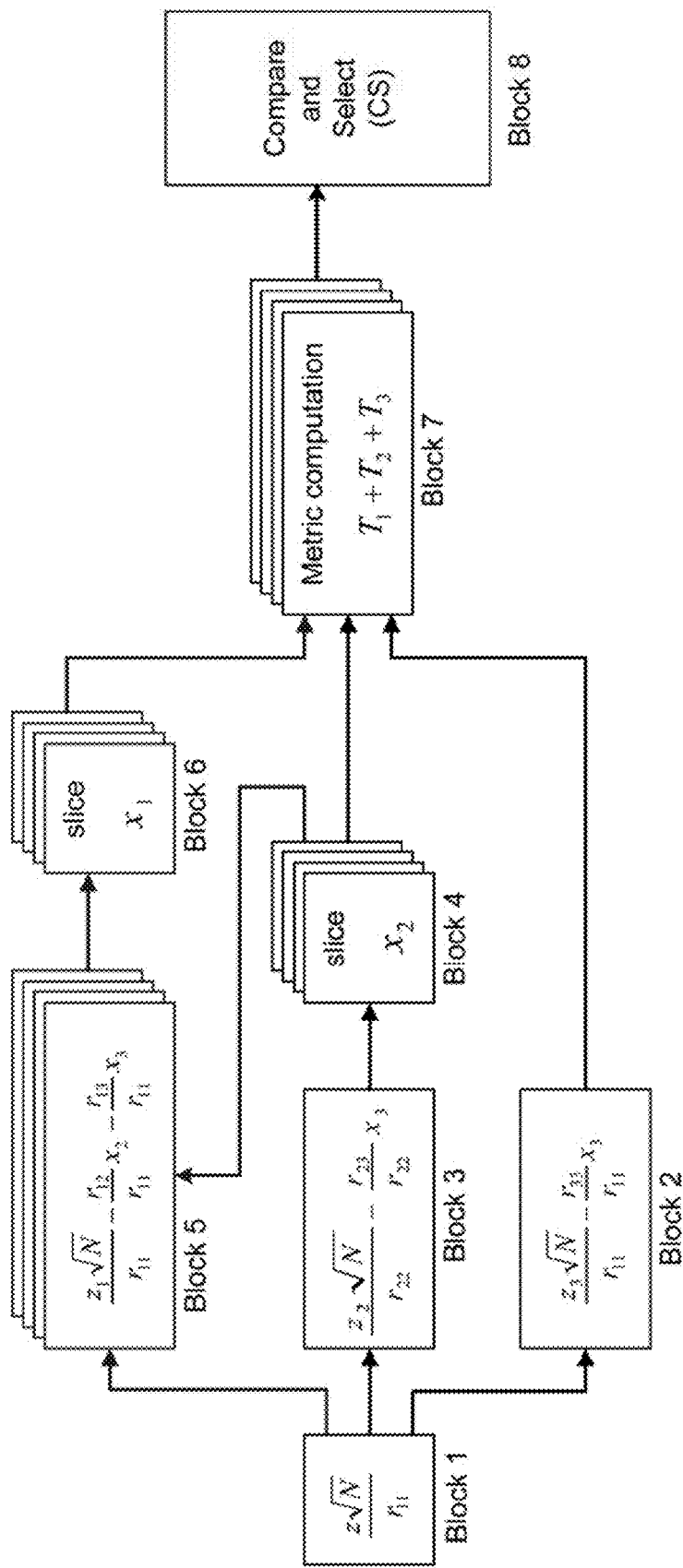
FIG. 7 is a block diagram illustrating an example implementation of the 3ML algorithm for computing LLR values for the bits in a transmitted signal $x_3$.

FIG. 7 is a block diagram illustrating an example implementation of the 3ML algorithm for computing LLR values for the bits in a transmitted signal $x_3$. Blocks 1-8 of this implementation of the 3ML data detection technique are described below. In some embodiments, each of the blocks 1-8 comprises an "equalizer module" (or an "equalizer"). As described herein, in some embodiments, the 2ML and ZF-ML data detection techniques are implemented using a subset of the equalizer modules 1-8 (i.e., blocks 1-8) shown in FIG. 7. As described below, the 2ML data detection technique is implemented, in some embodiments, by disabling equalizer modules 5 and 6 (i.e., blocks 5 and 6). The ZF-ML data detection technique is implemented, in some embodiments, by modifying one or more operations of equalizer module 5 (i.e., block 5) and performing pre-processing to modify one or more inputs to the equalizer modules 1-8.

In FIG. 7, block 1 includes the received signal y, represented as $$\frac{z\sqrt{N}}{r_{11}},$$

where the value z results from the relationship $z=Q^H y$ and $r_{11}$ is a value from an upper triangular matrix $$R = \begin{bmatrix} r_{11} & r_{12} & r_{13} \\ 0 & r_{22} & r_{23} \\ 0 & 0 & r_{33} \end{bmatrix},$$

and where a QR decomposition of a channel matrix H is performed according to the relationship H=QR. The $\sqrt{N}$ value is a constellation-specific scaling factor. The received signal y of block 1 is received at a block. 2 that is used to determine a $T_3$ value equal to $$\frac{z_3\sqrt{N}}{r_{11}} - \frac{r_{33}}{r_{11}}x_3.$$

In determining the $T_3$ value in block 2, the $x_3$ value is fixed, as described above in FIG. 6. For example, the $x_3$ value is initially fixed to a first possible value of $x_3$, and using the fixed first possible value of $x_3$, $x_2$ and $x_1$ values that minimize the $T_2$ and $T_1$ terms, respectively, of a $T_1+T_2+T_3$ distance equation are determined (e.g., a $T_1+T_2+T_3$ distance equation similar to Equation 1, above).

For the fixed $x_3$ value, a term $$\frac{z_2\sqrt{N}}{r_{22}} - \frac{r_{23}}{r_{22}}x_3$$

of block 3 is sliced to determine the $x_2$ value that minimizes the $T_2$ term. The sliced $x_2$ value is stored in block 4. For the fixed $x_3$ value and the sliced $x_2$ value, a term $$\frac{z_1\sqrt{N}}{r_{11}} - \frac{r_{12}}{r_{11}}x_2 - \frac{r_{13}}{r_{11}}x_3$$

of block 5 is sliced to determine the $x_1$ value that minimizes the $T_1$ term. As illustrated in FIG. 7, block 4 is connected to block 5, such that block 5 can utilize the sliced $x_2$ value in determining the optimal $x_1$ value that minimizes the $T_1$ term. The sliced $x_1$ value is stored in block 6. In one example, slicing is performed for 16 constellation symbols at a time. Further, in one example, blocks 2-8 of FIG. 7 process 16 constellation points in every clock cycle. One tone may be processed every four clock cycles. The system of FIG. 7 may output soft metrics for one spatial stream every four clock cycles.

In block 7, a distance value equal to $T_1+T_2+T_3$ is calculated based on the fixed $x_3$ value, the sliced $x_2$ value, and the sliced $x_1$ value. The $T_1+T_2+T_3$ distance value may be calculated according to Equation 1, above, for example. The steps described above are repeated in blocks 1-7 for all possible values of $x_3$ to generate K distance values. The K distance values may be received at a block 8, where the K distance values are further compared and selected to obtain LLRs for the bits corresponding to $x_3$.

In a hardware implementation, three identical 3ML systems may be used to compute LLRs corresponding to bits in $x_3$, $x_2$, and $x_1$ (e.g., one 3ML system for each spatial stream). The three identical 3ML systems may be configured to operate in parallel, or the 3ML systems may be configured to operate in series. Each of the 3ML systems may include blocks equalizer modules) similar to blocks 1-3 of FIG. 7. In other examples, certain of blocks 1-8 may be re-used among the three 3ML systems. For example, in example implementations, block 1 may be re-used among all three 3ML systems.

The 2ML data detection scheme, which implements a 2×2 MIMO system, is derived from the 3ML data detection scheme. Specifically, by removing or disabling (e.g., turning off) blocks 5 and 6, the system of FIG. 7 may be configured to be used to implement the 2ML data detection scheme, i.e., in a 2×2 MIMO system with two spatial streams. Removing or disabling blocks 5 and 6 allows the system of FIG. 7 to be backwards compatible with existing hardware and transmission systems. In making the system of FIG. 7 backwards compatible, a search space is ($x_2$, $x_3$) instead of ($x_1$, $x_2$, $x_3$), and only blocks 2, 3, 4, 7, and 8 are used. QR decomposition of the channel matrix B is performed to yield a 2×2 R matrix $$\begin{bmatrix} R_{11} & R_{12} \\ 0 & R_{22} \end{bmatrix}.$$

Thus, $r_{11}$ is replaced by $R_{11}$, $r_{33}$ is replaced by $R_{22}$, $r_{23}$ is replaced $R_{12}$, and $r_{22}$ is replaced by a value of 1 in blocks 1, 2, and 3. In block 7, $T_1$ is set to 0.

Although computation of LLRs corresponding to bits in $x_3$ is illustrated in FIG. 7 and described above, similar block diagram configurations may be used to compute LLRs corresponding to bits in $x_2$ and $x_1$. For example, as noted above, a QR decomposition is performed to obtain an upper triangular matrix R used in computing the LLR values for $x_3$. QR decompositions can similarly be performed to obtain upper triangular matrices S and T for computing LLR values for $x_2$ and $x_1$, respectively. In block diagrams similar to the block diagram of FIG. 7, the LLR values for $x_2$ and $x_1$ are computed by fixing $x_2$ and $x_1$ values, respectively, and slicing to minimize the $T_1+T_2+T_3$ distance.

Specifically, the block diagram of FIG. 7 or similar block diagrams may be used in processing data for a third spatial stream where the QR decomposition of the channel matrix H is performed using a unitary matrix $Q_1^H$, and the y vector is transformed according to the relationship $z=Q_1^H y$, such that $$\begin{bmatrix} z_1 \\ z_2 \\ z_3 \end{bmatrix} = Q_1^H \begin{bmatrix} y_1 \\ y_2 \\ y_3 \end{bmatrix} = \begin{bmatrix} r_{11} & r_{12} & r_{13} \\ 0 & r_{22} & r_{23} \\ 0 & 0 & r_{33} \end{bmatrix} \begin{bmatrix} x_1 \\ x_2 \\ x_3 \end{bmatrix} + n'.$$

For every possible value of $x_3$, a term $$\frac{z_2}{r_{22}} - \frac{r_{23}x_3}{r_{22}}$$

is sliced to determine an optimal $x_2$ value. Using the fixed $x_3$ value and the sliced $x_2$ value, a term $$\frac{z_1}{r_{11}} - \frac{r_{12}x_2}{r_{11}} - \frac{r_{13}x_3}{r_{11}}$$

is sliced to determine an optimal $x_1$ value. For each bit position j of $x_3$, a soft metric LLR value is computed as $|r_{11}|D(0)-D(1))$, where $$D(k) = \min_{x_3: x_3^{(j)}=k} \left\{ \left| \frac{z_1}{r_{11}} - x_1 - \frac{r_{12}x_2}{r_{11}} - \frac{r_{13}x_3}{r_{11}} \right| + \left| \frac{z_2}{r_{11}} - \frac{r_{22}x_2}{r_{11}} - \frac{r_{23}x_3}{r_{11}} \right| + \left| \frac{z_3}{r_{11}} - \frac{r_{33}x_3}{r_{11}} \right| \right\}.$$

In processing data for a second spatial stream $x_2$, the QR decomposition of a permutated, matrix H is per-formed using a unitary matrix $Q_2^H$, and the y vector is transformed to obtain a w vector according to $$\begin{bmatrix} w_1 \\ w_2 \\ w_3 \end{bmatrix} = Q_2^H \begin{bmatrix} y_1 \\ y_2 \\ y_3 \end{bmatrix} = \begin{bmatrix} s_{11} & s_{12} & s_{13} \\ 0 & s_{22} & s_{23} \\ 0 & 0 & s_{33} \end{bmatrix} \begin{bmatrix} x_1 \\ x_2 \\ x_3 \end{bmatrix} + n''.$$

In the preceding relationship, $s_{11}$, $s_{22}$, and $s_{33}$ are real values. For every possible value of $x_2$, a term $$\frac{w_2}{s_{22}} - \frac{s_{23}x_2}{s_{22}}$$

is sliced to determine an optimal $x_3$ value. Using the fixed $x_2$ value and the sliced $x_3$ value, a term $$\frac{w_1}{s_{11}} - \frac{s_{13}x_2}{s_{11}} - \frac{s_{12}x_3}{s_{11}}$$

is sliced to determine an optimal $x_1$ value. For each bit position j of $x_2$, a soft metric LLR value is computed as $|s_{11}|D(0)-D(1))$, where $$D(k) = \min_{x_2: x_2^{(j)}=k} \left\{ \left| \frac{w_1}{s_{11}} - x_1 - \frac{s_{12}x_2}{s_{11}} - \frac{s_{13}x_3}{s_{11}} \right| + \left| \frac{w_2}{s_{11}} - \frac{s_{22}x_3}{s_{11}} - \frac{s_{23}x_3}{s_{11}} \right| + \left| \frac{w_3}{s_{11}} - \frac{s_{33}x_2}{s_{11}} \right| \right\}.$$

In processing data for a first spatial stream $x_1$, the QR decomposition of a permutated channel matrix H is performed using a unitary matrix $Q_3^H$, and the y vector is transformed to obtain a v vector according to $$\begin{bmatrix} v_1 \\ v_2 \\ v_3 \end{bmatrix} = Q_3^H \begin{bmatrix} y_1 \\ y_2 \\ y_3 \end{bmatrix} = \begin{bmatrix} t_{11} & t_{12} & t_{13} \\ 0 & t_{22} & t_{23} \\ 0 & 0 & t_{33} \end{bmatrix} \begin{bmatrix} x_2 \\ x_3 \\ x_1 \end{bmatrix} + n'''.$$

In the preceding relationship, and in are real values. For every possible value of $x_1$, a term $$\frac{v_2}{t_{22}} - \frac{t_{23}x_1}{t_{22}}$$

is sliced to determine an optimal $x_3$ value. Using the fixed $x_1$ value and the sliced $x_3$ value, a term $$\frac{v_1}{t_{11}} - \frac{t_{12}x_3}{t_{11}} - \frac{t_{13}x_1}{t_{11}}$$

is sliced to determine an optimal $x_2$ value. For each bit position j of $x_1$, a soft metric LLR value is computed as $|t_{11}|D(0)-D(1))$ where $$D(k) = \min_{x_1 : x_1^{(j)} = k} \left\{ \left| \frac{v_1}{t_{11}} - \frac{t_{13}x_1}{t_{11}} - \frac{t_{12}x_3}{t_{11}} - x_2 \right| + \right.$$

$$\left. \left| \frac{v_2}{t_{11}} - \frac{t_{23}x_1}{t_{11}} - \frac{t_{22}x_3}{t_{11}} \right| + \left| \frac{v_3}{t_{11}} - \frac{t_{33}x_1}{t_{11}} \right| \right\}.$$

The above-described QR decompositions and matrix transformations to obtain LLR values for $x_1$, $x_2$, and $x_3$ may be performed in parallel or in series.

Figure 8A:
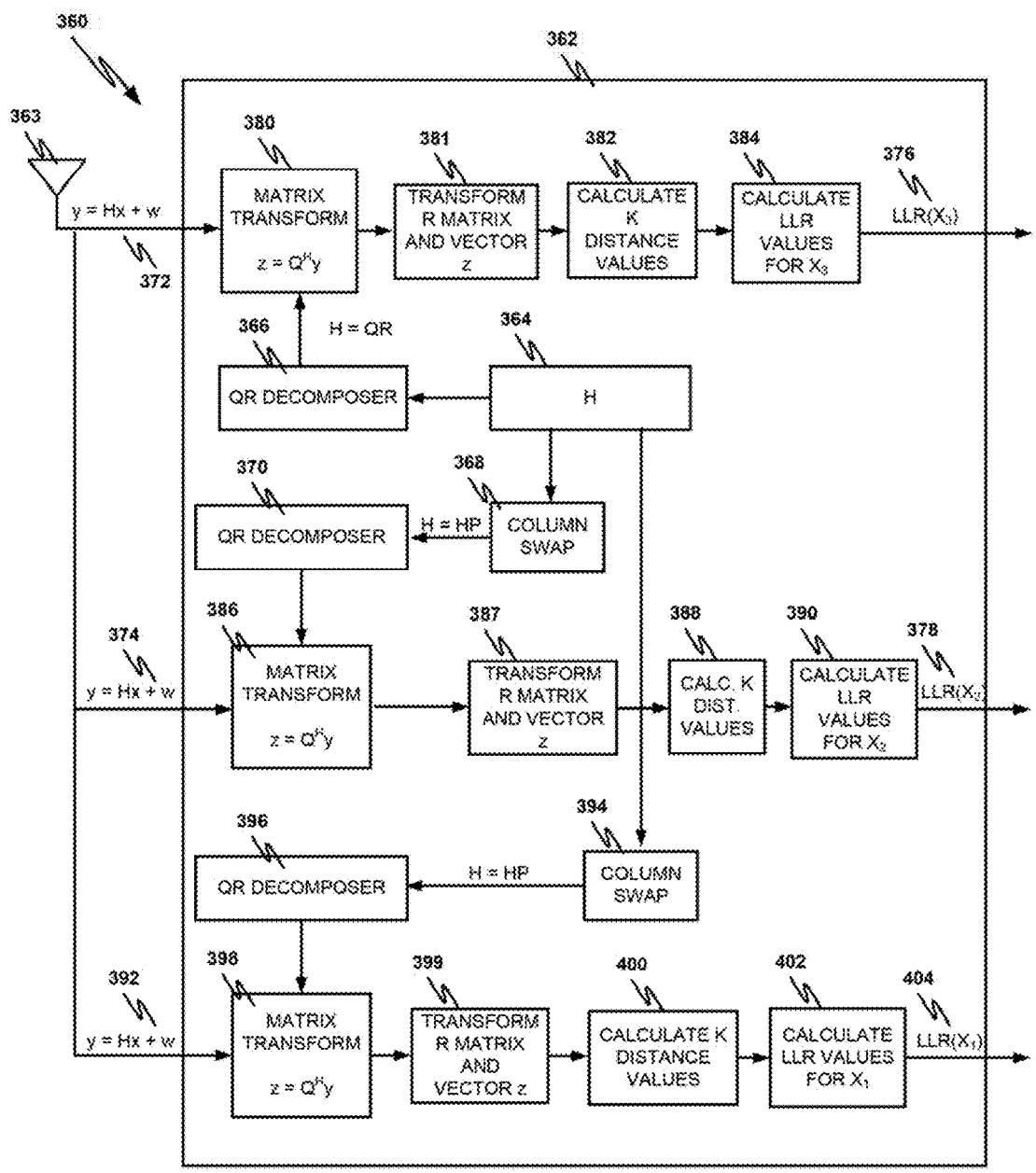
FIG. 8A is a block diagram illustrating internal components of an example matrix decoder for use in a communication device, where the example matrix decoder implements a zero-forcing, maximum-likelihood (ZF-ML) algorithm for determining LLR values for three spatial streams.
Figure 8B:
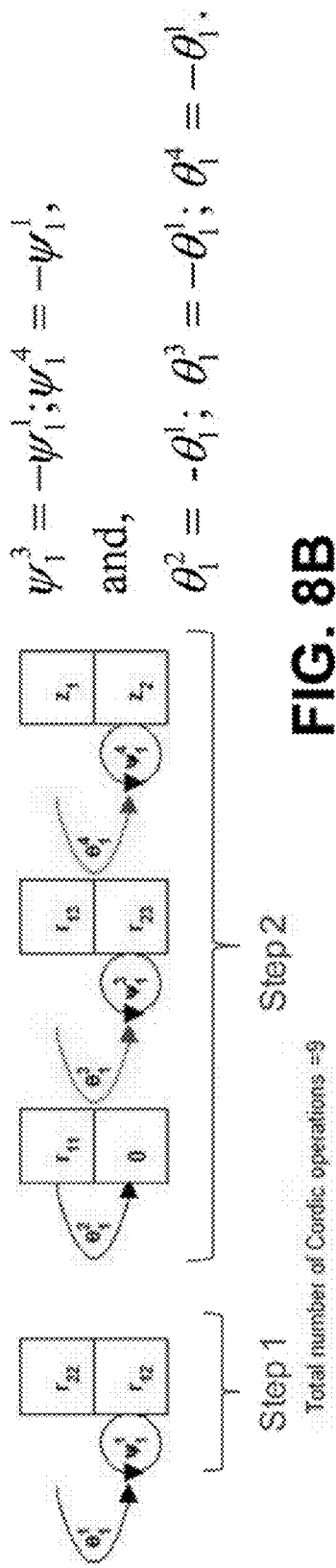
FIG. 8B illustrates example coordinate rotational, digital computer (CORDIC) operations utilized in transforming an R matrix and a z vector, according to an embodiment of the present disclosure.
Figure 8C:
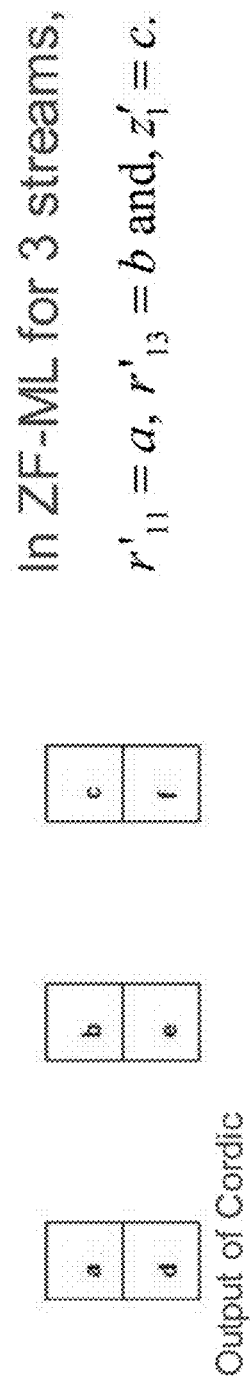
FIG. 8C illustrates example outputs of the CORDIC operations of FIG. 8B according to an embodiment of the present disclosure.
Figure 9:
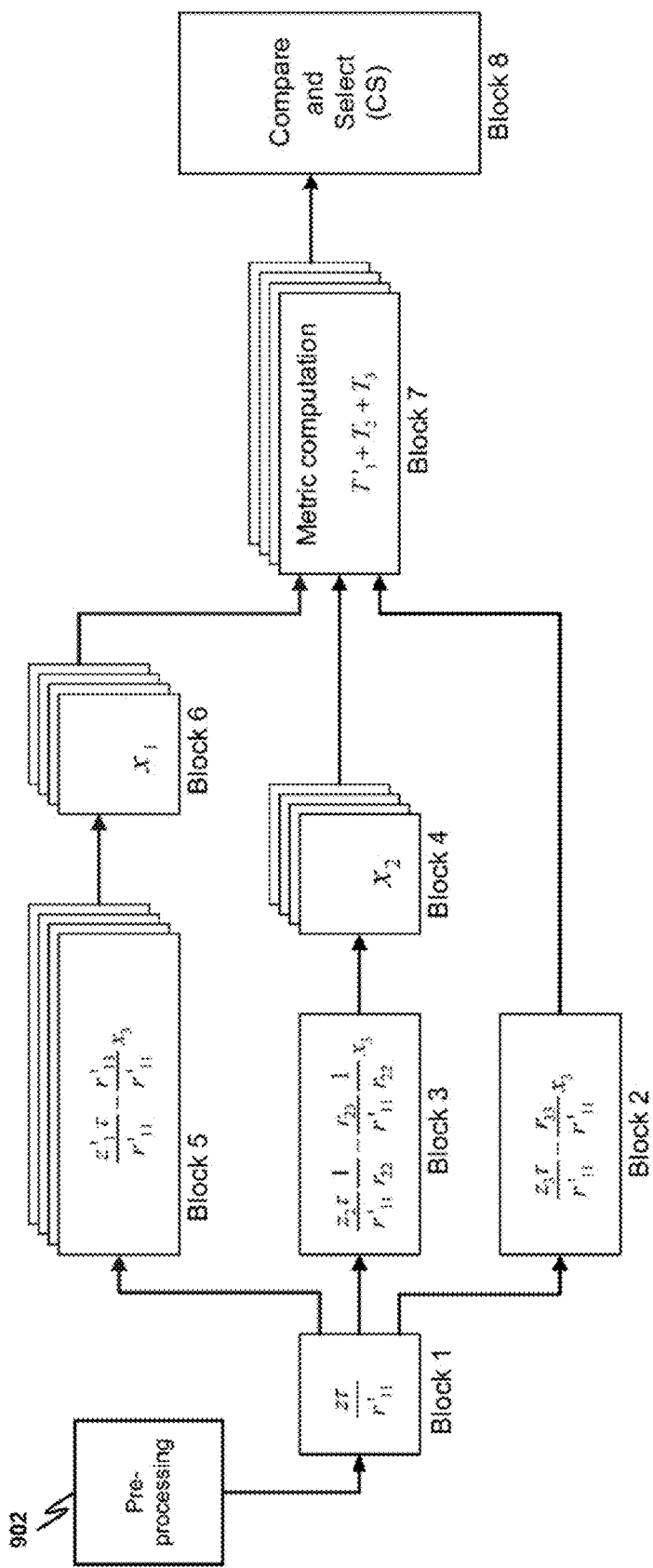
FIG. 9 is a block diagram illustrating an example implementation of the ZF-ML algorithm for computing LLR values for the bits in a transmitted signal $x_3$.

FIGS. 8A-9 illustrate features of the ZF-ML data detection technique. FIG. 8A is a block diagram 360 illustrating internal components of an example matrix decoder 362 for use in a receiver, where the example matrix decoder implements the ZF-ML data detection technique for determining LLR values for three spatial streams. Although the example of FIG. 8A uses the ZF-ML algorithm in the context of a system utilizing three spatial streams, the ZF-ML algorithm is not limited to this context. As described below, in embodiments, the ZF-ML algorithm is used in systems with M spatial streams, where M is greater than or equal to three. Prior to receiving data signals over the one or more antennas 303, matrix calculations are done with respect to the estimated channel matrix H 364. As illustrated at 366, a QR decomposition of the H matrix 364 may be performed such that H=QR. The Q matrix is a unitary matrix, and the R matrix is an upper triangular matrix represented as $$R = \begin{bmatrix} r_{11} & r_{12} & r_{13} \\ 0 & r_{22} & r_{23} \\ 0 & 0 & r_{33} \end{bmatrix}.$$

A similar QR decomposition procedure is performed at 370, 396 using a permutated channel matrix, as described in greater detail below. At 368 and 394, the channel matrix H 364 is multiplied by a permutation matrix. In the current example including three spatial streams, the permutation matrices used at 368 and 394 may be, for example, $$P = \begin{bmatrix} 0 & 0 & 1 \\ 0 & 1 & 0 \\ 1 & 0 & 0 \end{bmatrix} \text{ or } P = \begin{bmatrix} 1 & 0 & 0 \\ 0 & 0 & 1 \\ 0 & 1 & 0 \end{bmatrix},$$

such that the columns of the channel matrix H are swapped when multiplied by the permutation matrix, in a modified version of the block diagram 360 of FIG. 8A, rather than swapping columns of the H matrix 364, columns of the R matrix may be swapped.

The matrix decoder 362 executes over three paths 372, 374, 392 that may operate in series or in parallel. The first path 372 calculates LLR values 376 for data values associated with third stream, the second path 374 calculates LLR values 378 for data values associated with a second stream, and the third path 392 calculates LLR values 404 for data values associated with a first stream. These LLR values 376, 378, 404 may be combined and decoded as described above with reference to FIG. 1.

The first path 372 begins at a matrix transformer 380. In the three spatial stream case, the matrix transformer 380 receives the first, second, and third signals as a 3×1 vector ($[y_1, y_2, y_3]^T$). The matrix transformer 380 transforms the y vector according to the relationship $z=Q^H y$, resulting in a 3×1 z vector ($[z_1, z_2, z_3]^T$). Specifically, in the matrix transformer 380, the relationship y=Hx+n may be multiplied by $Q^H$ to obtain $z=Q^H y = Rx+Q^H n$, which is expanded to $$\begin{bmatrix} z_1 \\ z_2 \\ z_3 \end{bmatrix} = \begin{bmatrix} r_{11} & r_{12} & r_{13} \\ 0 & r_{22} & r_{23} \\ 0 & 0 & r_{33} \end{bmatrix} \begin{bmatrix} x_1 \\ x_2 \\ x_3 \end{bmatrix} + \begin{bmatrix} n_1 \\ n_2 \\ n_3 \end{bmatrix}.$$

In the three spatial stream system, each data symbol transmitted, $x_i$ (where i-1 corresponds to data transmitted on a first spatial stream, i-2 corresponds to data transmitted on a second spatial stream, and i-3 corresponds to data transmitted on a third spatial stream) maps to n bits $\{b_1^{(i)}, b_2^{(i)}, \ldots, b_3^{(i)}\}$, $K=2^n$ is the alphabet size of the underlying modulation, such as binary phase shift keying (BPSK), quadrature amplitude modulation (QAM), etc.

In 3ML approaches, after performing the QR decomposition at 366 and after transforming the received signal vector y into a rotated signal vector z at 380, a Minimum distance value is calculated for each of the K possible values of x3, in a system using n=6 bits, the alphabet size K is equal to 64. In the ML approaches, the minimum distance is calculated according to Equation 1, above, for each possible value. Specifically, $x_1$ and $x_2$ values that minimize the distance $T_1+T_2+T_3$ are determined for each possible $x_3$ value. However, the complexity of computing the $T_1$ term is relatively high in the 3ML algorithm, and the computation may require a sliced value $x_2$, thus increasing the complexity of the calculation.

In the ZF-ML algorithm, a complexity of the distance calculation is reduced by transforming the R matrix and the rotated signal vector z such that one or more elements of the R matrix having complex number values are set equal to zero. Specifically, in the ZF-ML algorithm, to decrease the computational complexity and to avoid having to wait for the sliced value of $x_2$, the R matrix and the rotated signal vector z are transformed such that an $r_{12}$ element of the R matrix is set equal to zero (i.e., $r_{12}=0$). Prior to the transformation, the $r_{12}$ element is a complex number value, which results in increased complexity in calculating the $T_1$ terra in Equation 1. Thus, by transforming the R matrix and the rotated signal vector z in a manner that eliminates the complex number value $r_{12}$ term from the distance calculation, as described below, a complexity of the distance calculation is reduced.

The transforming of the R matrix and the vector z are shown in a block 381 of FIG. 8A. In embodiments, to achieve $r_{12}=0$, multiplication operations are performed. Specifically, as noted above, prior to the transforming of the R matrix and the rotated signal vector z, the R matrix is $$\begin{bmatrix} r_{11} & r_{12} & r_{13} \\ 0 & r_{22} & r_{23} \\ 0 & 0 & r_{33} \end{bmatrix},$$

and the totaled signal sector z is $[z_1, z_2, z_3]$. In embodiments, after the transforming of the R matrix and the rotated signal vector z, the transformed R matrix is $$\begin{bmatrix} r'_{11} & 0 & r'_{13} \\ 0 & r_{22} & r_{23} \\ 0 & 0 & r_{33} \end{bmatrix},$$

and the transformed vector z is [$z_1'$, $z_2$, $z_3$]. As can be seen in the transformed R matrix, $r_{12}$ is set equal to zero as a result of the transforming. To achieve this, multiplication operations are performed as follows, to calculate $z_1'$, $r_{11}'$, and $r_{13}'$, respectively:

$$z_1' = \left(z1 - \frac{r_{12}}{r_{22}}z2\right)\frac{1}{\sqrt{1+\left|\frac{r_{12}}{r_{22}}\right|^2}},$$

$$r_{11}' = r_{11}\frac{1}{\sqrt{1+\left|\frac{r_{12}}{r_{22}}\right|^2}}, \text{ and } r_{13}' = \left(r_{13} - \frac{r_{12}}{r_{22}}r_{23}\right)\frac{1}{\sqrt{1+\left|\frac{r_{12}}{r_{22}}\right|^2}}.$$

In embodiments, the above multiplication operations are performed using one or more coordinate rotational digital computer (CORDIC) computations. To illustrate the use of such CORDIC computations, reference is made to FIGS. 8B and 8C. From the above discussion, it can be seen that the operation to make $r_{12}=0$ is $$\text{Row}_1 \leftarrow \frac{1}{\sqrt{1+\frac{|r_{12}|^2}{r_{12}^2}}}\left(\text{Row}_1 - \frac{r_{12}}{r_{22}}\text{Row}_2\right) = \quad \text{(Equation 4)}$$

$$\text{Row}_1 \leftarrow \left(\frac{r_{22}}{\sqrt{r_{22}^2+|r_{12}|^2}}\text{Row}_1 - \frac{|r_{12}|}{\sqrt{r_{22}^2+|r_{12}|^2}}e^{j<r_{12}}\text{Row}_1\right).$$

If $$\frac{r_{22}}{\sqrt{r_{22}^2+|r_{12}|^2}}$$

can be treated as $\cos(\theta)$, then $$\sin(\theta) = \sqrt{1-\cos^2(\theta)} = \frac{|r_{12}|}{\sqrt{r_{22}^2+|r_{12}|^2}}.$$

Now, Equation 4 is $\text{Row}_1 \leftarrow (\cos(\theta)\text{Row}_1 - \sin(\theta)e^{j\psi}\text{Row}_2)$, where $\psi = \angle r_{12}$. Accordingly, in embodiments, two angles are extracted and applied as per Equation 4 on the other elements.

In embodiments, the extraction of the two angles and the application of the two angles on other elements is performed using CORDIC computations, as shown in FIGS. 8B and 8C. Specifically, in FIG. 8B, in a first step, the angles $\psi_1^1=-\psi$, and $\theta_1^1=-\theta$ are extracted from $r_{12}$ and $r_{22}$ using CORDIC computation. Subsequently, in a second step, the extracted angles are applied on the other elements of row 1 and row 2 using CORDIC computation, as shown in FIG. 8B. In performing the first and second steps, a total number of 9 CORDIC operations are performed, in embodiments. An output of the CORDIC operations is shown in FIG. 8C.

With reference again to FIG. 8A, using the transformed R matrix $$\begin{bmatrix} r_{11}' & 0 & r_{13}' \\ 0 & r_{22} & r_{23} \\ 0 & 0 & r_{33} \end{bmatrix}$$

and the transformed vector z [$z_1'$, $z_2$, $z_3$], a minimum distance value is calculated at 382 for each of the K possible values of $x_3$. The minimum distance calculated at 382 is computed according to the following formula, where R' represents the transformed R matrix and z' represents the transformed vector z:

$$\|z'-R'x\|=T_1'+T_2+T_3=|z_1'-r_{11}'x_1-r_{13}'x_3|^2+|z_2-r_{22}x_2-r_{23}x_3|^2+|z_3-r_{33}x_3|^2. \quad \text{(Equation 5)}$$

for each possible $x_2$ value. As seen above, the complexity of calculating the $T_1'$ term is decreased due to the elimination of the complex number value $r_{12}$ (i.e., the $T_1'$ term is not dependent on $x_2$).

It is noted that in the distance metric calculated according to Equation 5 above, the $T_1'$ and $T_2$ terms have the same complexity, and in embodiments where the terms of the distance metric are divided by $r_{11}'$ (e.g., as illustrated in FIG. 9 and discussed below with reference to that figure), the complexity of the $T_1'$ term is reduced further. Using the distance metric calculated according to Equation 5 assumes that noise is independent across $z_1'$, $z_2$, and $z_3$, and which is not necessarily true (e.g., $z_1'$ and $z_2$ are correlated in embodiments). Accordingly, the use of this distance metric results in some loss in accuracy, it is thus noted that the use of the ZF-ML data detection technique, as described with reference to FIGS. 8A-8C, provides a balance between, performance (e.g., accuracy) and complexity. More specifically, the use of the ZF-ML algorithm offers a high degree of accuracy while having a lower complexity as compared to the 3ML technique, potentially offering higher throughput and large savings in required hardware, power consumed, and computation time. The ZF-ML algorithm provides these technical advantages because the performed operation is equivalent to using a zero-forcing (ZF) estimate of $x_2$ from $T_2$ directly (i.e., without slicing) in $T_1$. Since ZF is a linear operation, the operation is simplified in the systems and methods described herein.

When distance values for all possible values of $x_3$ are calculated, LLR values are calculated at 384 for the data associated with the third spatial stream, $x_3$. The calculated LLR values are output as shown at 376. A similar process is followed along the second and first paths 374, 392 to calculate LLR values for data associated with the second spatial stream ($x_2$) and the first spatial stream ($x_1$), respectively. At 368, the channel matrix H 364 is permutated to swap the second and third columns of the channel matrix H 364 prior to QR decomposition. Swapping the columns of H in this manner causes the value $x_1$ to be pushed down to the bottom of the x vector ([$x_1$ $x_2$ $x_3$]$^T$). Similarly, at 394, the channel matrix H 364 is permutated to swap the first and third columns of the channel matrix H 364 prior to QR decomposition. Swapping the columns of H in this manner causes the value $x_1$ to be pushed down to the bottom of the x vector ([$x_1$ $x_2$ $x_3$]$^T$). Following permutation of the channel matrix H 364 at 368 and 394, QR decompositions are performed at 370 and 396 on the permutated channel matrices. Note that similar permutations can also be performed on the columns of R matrix from the QR at 370 or 396 and then perform QR of this permuted R matrix to obtain the LLR values of data associated with second and first spatial streams The second path 374 begins at a second matrix transformer 386. In the three spatial stream case, the matrix transformer 386 receives the first, second, and third spatial stream signals as a 3×1 vector ($[y_1, y_2, y_3]^T$). The second matrix transformer 386 transforms the received y vector according to the relationship $z=Q^H y$, resulting in a 3×1 z vector ($[z_1, z_2, z_3]^T$). Following the z transformation, at 387, the R matrix and z vector are transformed in a similar manner as was described above with reference to step 381. Following these transformations, a minimum distance value is calculated at 388 for each of the K possible values of $x_2$ in a similar manner as was described with respect to $x_3$ at 382. The minimum distance value calculated at 388 is calculated according to the formula:

$$\|z'-R'x\|=T_1'+T_2+T_3=|z_1'-r_{11}'x_1-r_{13}'x_2|^2+|z_2-r_{22}x_3-r_{23}x_2|^2+|z_3-r_{33}x_2|^2.$$

When distance values for all possible values of $x_2$ are calculated, LLR values are calculated at 390 for the data associated with the second spatial stream, $x_2$. The calculated LLR values are output as shown at 378.

The third path 392 begins at a third matrix transformer 398. In the three spatial stream case, the matrix transformer 398 receives the first, second, and third spatial stream signals as a 3×1 vector ($[y_1, y_2, y_3]^T$). The third matrix transformer 398 transforms the received y vector according to the relationship $z=Q^H y$, resulting in a 3×1 z vector ($[z_1, z_2, z_3]^T$). Following the z transformation, at 399, the R matrix and z vector are transformed in a similar manner as was described above with reference to steps 381 and 387. Following these transformations, a minimum distance value is calculated at 400 for each of the K possible values of $x_1$ in a similar manner as was described with respect to $x_3$ and $x_2$. The minimum distance value calculated at 400 is calculated, according to the formula:

$$\|z'-R'x\|=T_1'+T_2+T_3=|z_1'-r_{11}'x_2-r_{13}'x_1|^2+|z_2-r_{22}x_3-r_{23}x_1|^2+|z_3-r_{33}x_1|^2.$$

When distance values for all possible values of $x_1$ are calculated, LLR values are calculated at 402 for the data associated with the first spatial stream, $x_1$. The calculated LLR values are output as shown at 404. The calculated LLR values 376, 378, 404 for the $x_3$, $x_2$, and $x_1$ spatial, streams are passed to a decoder as soft information, in some embodiments.

Although the ZF-ML algorithm is described above in terms of an example using three spatial streams, this algorithm is applicable to systems having a number of spatial streams that is greater than or equal to three. To illustrate this, consider an example utilizing M spatial streams, where M is greater than or equal to three. In this example, a received signal model is as follows:

$$y = [h_1 \quad h_2 \quad \ldots \quad h_M]_{N \times M} \begin{bmatrix} x_1 \\ x_2 \\ \vdots \\ x_M \end{bmatrix} + n.$$

To obtain LLR for $x_M$, a QR decomposition is applied on $[h_1, h_2, \ldots, h_M]$, resulting in $$z = \begin{bmatrix} r_{11} & r_{12} & \ldots & r_{1M} \\ 0 & r_{22} & \ldots & r_{2M} \\ \vdots & \vdots & \ddots & \vdots \\ 0 & 0 & \ldots & r_{MM} \end{bmatrix} \begin{bmatrix} x_1 \\ x_2 \\ \vdots \\ x_M \end{bmatrix} + n.$$

According to the ZF-ML algorithm, to reduce the complexity of the computation, any of the non-diagonal element $r_{ij,j>i}$ are set equal to zero. The $r_{ij,j>i}$ can be set equal to zero using an operation $$\text{Row}_i \leftarrow \frac{1}{\sqrt{1+\frac{|r_{ij}|^2}{r_{jj}^2}}} \left( \text{Row}_i - \frac{r_{ij}}{r_{jj}} \text{Row}_j \right),$$

which can be implemented using CORDIC computations similar to those described above with reference to FIGS. 8B and 8C. It is noted that only $r_{ij,j>i}$ can be set equal to zero without affecting the upper triangle structure. Thus, $r_{jj}$ cannot be set equal to zero by maintaining the upper triangle structure.

The ZF-ML data detection technique is implemented, in embodiments, by (i) modifying operations performed by one or more of the 3ML equalizer modules (e.g., the 3ML equalizer modules illustrated in FIG. 7 and described above with reference to that figure), and (ii) performing pre-processing to modify inputs to the 3ML equalizer modules. To illustrate this, reference is made to FIG. 9. This figure is a block diagram illustrating an example implementation of the ZF-ML algorithm for computing LLR values for the bits in the transmitted signal $x_3$. Blocks 1-8 of this implementation of the ZF-ML data detection technique are described below. In some embodiments, each of the blocks 1-8 comprises an "equalizer module" (or an "equalizer").

In FIG. 9, block 1 includes the received signal v, represented as $$\frac{z\tau}{r_{11}'},$$

where the value z results from the relationship $z=Q^H y$ and $r'_{11}$ is a value from the transformed matrix $$R = \begin{bmatrix} r_{11}' & 0 & r_{13}' \\ 0 & r_{22} & r_{23} \\ 0 & 0 & r_{33} \end{bmatrix},$$

and where a QR decomposition of a channel matrix B is performed according to the relationship $H=QR$. The $\tau$ value is a constellation-specific scaling factor. The received signal y of block 1 is received at a block 2 that is used to determine a $T_3$ value equal to $$\frac{z_3\tau}{r_{11}'} - \frac{r_{33}}{r_{11}'} x_3.$$

In embodiments, in determining the $T_3$ value in block 2, the $x_3$ value is fixed. For example, the $x_3$ value is initially fixed to a first possible value of $x_3$, and rising the fixed first possible value of $x_3$, $x_2$ and $x_1$ values that minimize the $T_2$ and $T_1'$ terms, respectively, are determined.

Continuing in FIG. 9, for the fixed $x_3$ value, a term $$\frac{z_2 \tau}{r_{11}'} \frac{1}{r_{22}'} - \frac{r_{23}'}{r_{11}'} \frac{1}{r_{22}'} x_3$$

of block 3 is used to determine the $x_2$ value that minimizes the $T_2$ term. The $x_2$ value is stored in block 4. For the fixed $x_3$ value, a term $$\frac{z_1' \tau}{r_{11}'} - \frac{r_{13}'}{r_{11}'} x_3$$

of block 5 is used to determine the $x_1$ value that minimizes the $T_1'$ term. The $x_1$ value is stored in block 6. As can be seen in the figure, the term $$\frac{z_1' \tau}{r_{11}'} - \frac{r_{13}'}{r_{11}'} x_3$$

of block 5 does not include the $r_{12}$ term. As described above, using the ZF-ML algorithm, the $r_{12}$ term is eliminated from the distance calculation, thus resulting in reduced complexity. To achieve the $r_{12}=0$, a pre-processing block 902 is utilized in some embodiments. The R matrix and the z vector may be considered inputs to the system of FIG. 9, and the pre-processing block 902 is used to modify these inputs as described above to achieve $r_{12}=0$. Thus, for instance, the CORDIC computations and other operations described above are implemented in the pre-processing block 902, in embodiments.

It is noted that according to the ZF-ML algorithm, the output of block 4 (i.e., the $x_2$ value) is not required for block 5. Thus the ZF-ML algorithm relaxes a time constraint because blocks 3 and 4, and blocks 5 and 6 can be computed in parallel along with block 2. Thus, block 7 receives $x_1$, $x_2$, and $x_3$ at a same tune (or approximately the same time), in some embodiments.

In block 7, a distance value equal to $T_1'+T_2+T_3$ is calculated based on the $x_3$, $x_2$, and $x_1$ values. The $T_1'+T_2+T_3$ distance value may be calculated according to Equation 5, above, for example. In embodiments, the steps described above are repeated in blocks 1-7 for all possible values of $x_3$ to generate K distance values. The K distance values may be received at a block 8, where the K distance values are further compared and selected to obtain LLRs for the bits corresponding to $x_3$. Although computation of LLRs corresponding to bits in $x_2$ is illustrated in FIG. 9 and described above, similar block diagram configurations may be used to compute LLRs corresponding to bits in $x_2$ and $x_1$.

Figure 10:
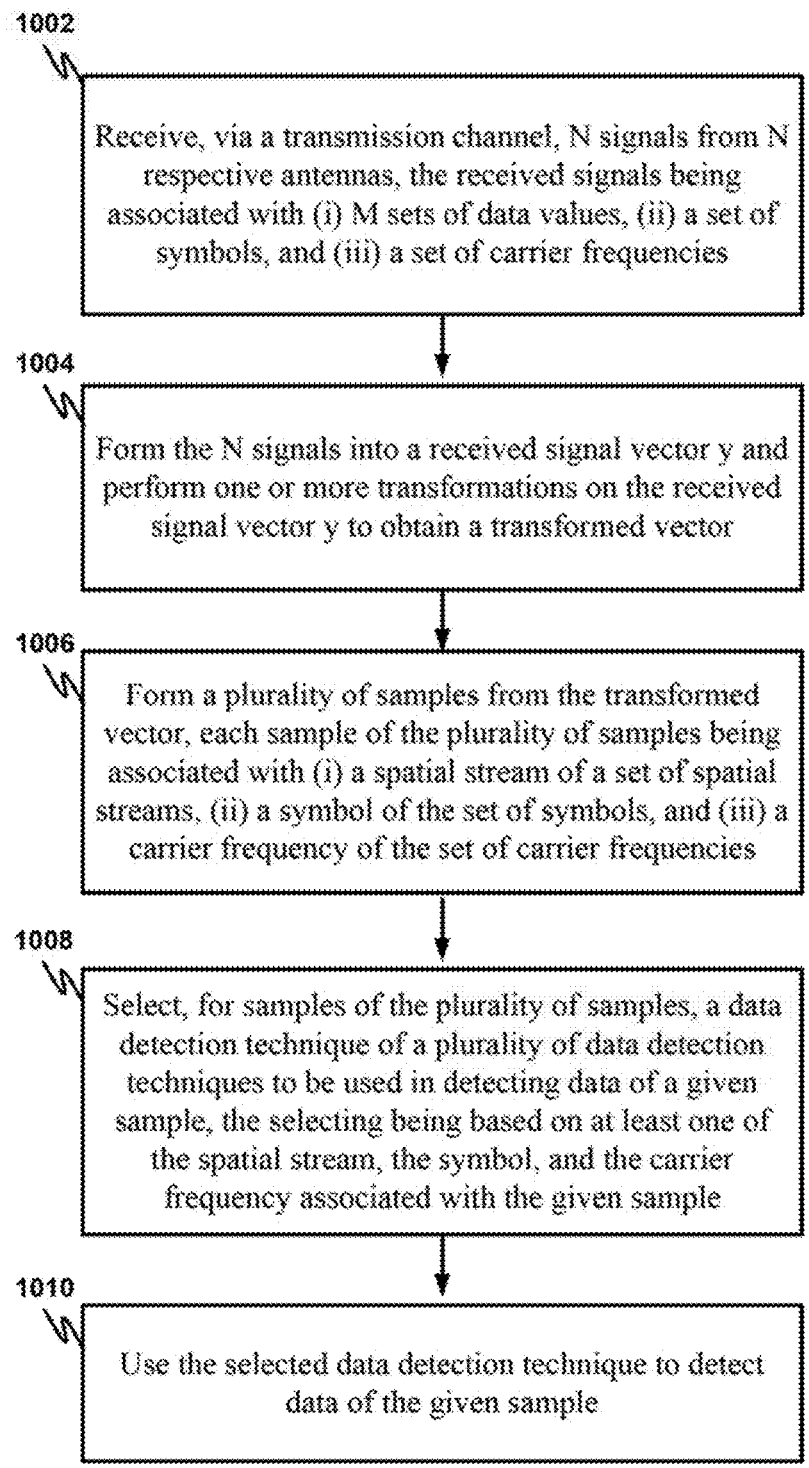
FIG. 10 is a flowchart illustrating an example method for detecting data in a received MIMO signal, in accordance with an embodiment of the present disclosure.

FIG. 10 is a flowchart illustrating an example method for detecting data in a received multiple-input-multiple-output (MIMO) signal, in accordance with an embodiment of the present disclosure. At 1002, N signals are received from N respective antennas, where the received signals are associated with (i) M sets of data values, (ii) a set of symbols, and (iii) a set of carrier frequencies. The N signals are received via a transmission channel. At 1004, the N signals are formed into a received signal vector y, and one or more transformations are performed on the received signal vector y to obtain a transformed vector. At 1006, a plurality of samples are formed from the transformed vector, where each sample of the plurality of samples is associated with (i) a spatial stream of a set of spatial, streams, (ii) a symbol of the set of symbols, and (iii) a carrier frequency of the set of carrier frequencies. At 1008, for samples of the plurality of samples, a data detection technique of a plurality of data detection techniques to be used in detecting data of a given sample is selected. The selecting is based on at least one of the spatial stream, the symbol, and the carrier frequency associated with the given sample. At 1010, the selected data detection technique is used to detect data of the given sample.

Figure 11:
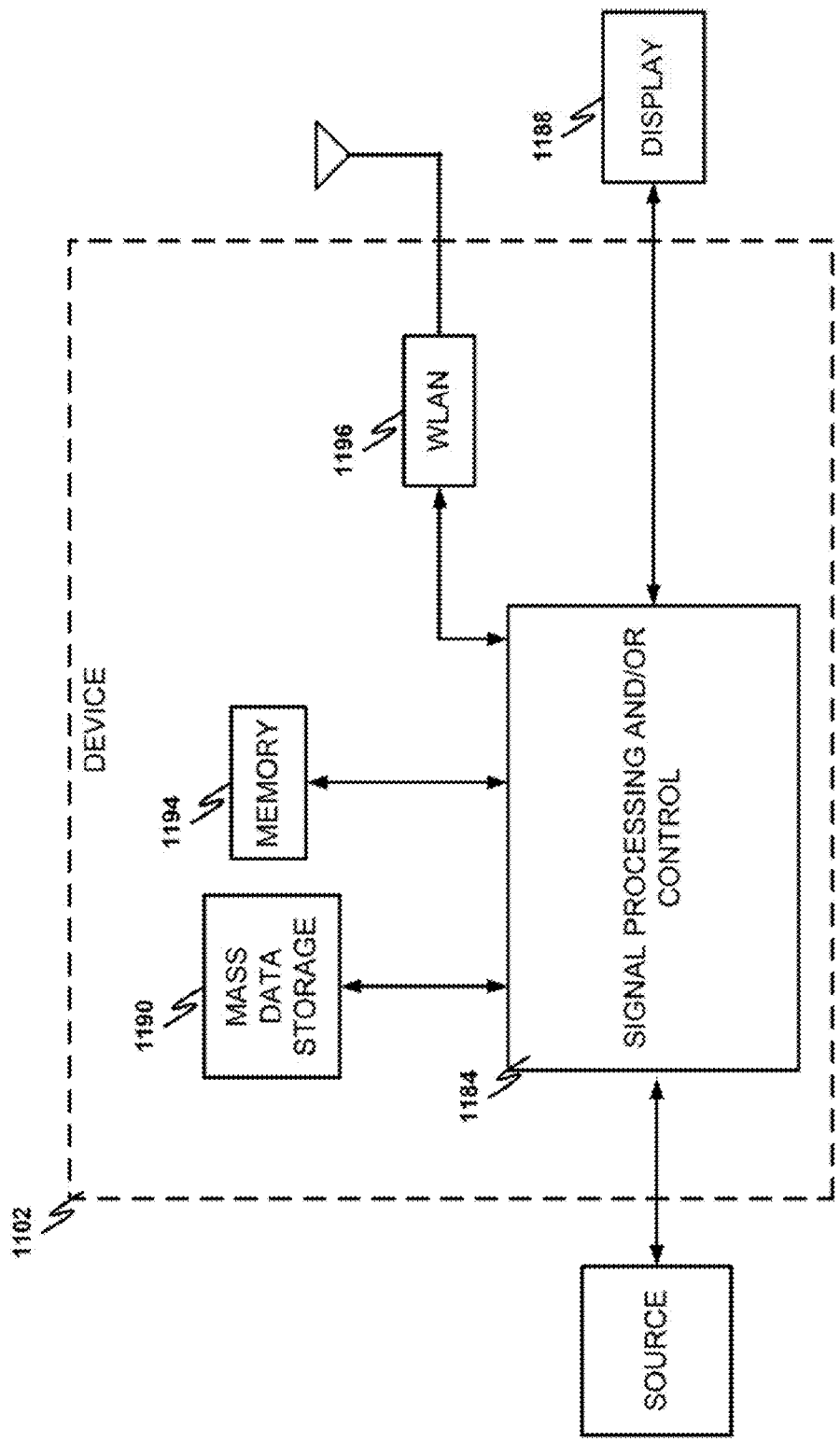
FIG. 11 depicts an example device illustrating an implementation of the present disclosure.

FIG. 11 depicts an example device 1102 illustrating an implementation of the present disclosure. In some embodiments, the implementation of the present disclosure includes (i) one or more antennas configured to receive signals (e.g., N antennas configured to receive, via a transmission channel, N respective signals), and (ii) one or more integrated circuit (IC) devices configured to perform the operations described herein. In the embodiment of FIG. 11, the device 1102 can be any device capable of wireless communication, e.g., a cellular phone, set top box, smart phone, computer system, and the like. The techniques of the present disclosure may implement signal processing or control circuits 1184, a WLAN interface 1196, or mass data storage 1190 of the device 1102. Signal processing or control circuits 1184 or other circuits (not shown) of the device 1102 may process data, perform coding or encryption, perform calculations, format data, or perform any other function as required by an application for the device 1102.

The device 1102 may communicate with mass data storage 1190 that stores data in a nonvolatile manner. Mass data storage 1190 may include optical or magnetic storage devices, for example hard disk drives HDD or DVD drives. The device 1102 may be connected to memory 1194 such as RAM, ROM, low latency nonvolatile memory such as Sash memory, or other suitable electronic data storage. The device 1102 may also support connections with a WLAN via the WLAN network, interface 1196.

This written description uses examples to disclose the invention, including the best mode, and also to enable a person skilled in the art to make and use the invention. It should be noted that the systems and methods described herein may be equally applicable to other frequency modulation encoding schemes. The patentable scope of the invention may include other examples.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A method of detecting data in a received multiple-input-multiple-output (MIMO) signal, the method comprising:

receiving, via a transmission channel, N signals from N respective antennas, the received signals being associated with (i) M sets of data values, (ii) a set of symbols, and (iii) a set of carrier frequencies, wherein N and M are non-zero positive integers;

forming the N signals into a received signal vector y and performing one or more transformations on the received signal vector y to obtain a transformed vector, forming a plurality of samples from the transformed vector, each sample of the plurality of samples being associated with (i) a spatial stream of a set of spatial streams, (ii) a symbol of the set of symbols, and (iii) a carrier frequency of the set of carrier frequencies;

selecting, for samples of the plurality of samples, a data detection technique of a plurality of data detection techniques to be used in detecting data of a given sample, the selecting being based on at least one of the spatial stream, the symbol, and the carrier frequency associated with the given sample; and using the selected data detection technique to detect data of the given sample;

the selecting and using the selected data detection technique further comprising, based on a first data detection technique being selected, using a set of equalizer modules of a communication device to implement the first data detection technique, and based on a second data detection technique being selected, (a) disabling one or more equalizer modules of the set of equalizer modules to implement the second data detection technique, or (b) modifying one or more operations performed in an equalizer module of the set of equalizer modules, and modifying one or more inputs to the set of equalizer modules to implement the second data detection technique.

2. The method of claim 1, wherein the selecting comprises:

selecting the first data detection technique of the plurality of data detection techniques for processing samples associated with a first spatial stream of the set of spatial streams; and selecting the second data detection technique of the plurality of data detection techniques for processing samples associated with a second spatial stream of the set of spatial streams, wherein the first data detection technique is different than the second data detection technique.

3. The method of claim 1, wherein the selecting comprises:

selecting the first data detection technique of the plurality of data detection techniques for processing samples associated with a first symbol of the set of symbols; and selecting the second data detection technique of the plurality of data detection techniques for processing samples associated with a second symbol of the set of symbols, wherein the first data detection technique is different than the second data detection technique.

4. The method of claim 1, wherein the selecting comprises:

selecting the first data detection technique of the plurality of data detection techniques for processing samples associated with a first carrier frequency of the set of carrier frequencies; and selecting the second data detection technique of the plurality of data detection techniques for processing samples associated with a second carrier frequency of the set of carrier frequencies, wherein the first data detection technique is different than the second data detection technique.

5. The method of claim 1, wherein the selecting of the data detection technique for the given sample comprises:

computing a signal-to-interference ratio (SIR) or a signal-to-noise ratio (SNR) associated with the given sample; and comparing the computed SIR or SNR or both to a threshold, wherein the selecting of the data detection technique for the given sample is based on the comparison.

6. The method of claim 1, wherein the plurality of data detection techniques includes (i) maximum likelihood (ML) techniques, (ii) a zero-forcing (ZF) technique, and (iii) a technique that includes operations of both the ML techniques and the ZF technique.

7. The method of claim 1, wherein the selecting is based on (i) the symbol associated with the given sample, and (ii) the spatial stream associated with the given sample.

8. The method of claim 1, wherein the selecting is based on (i) the symbol associated with the given sample, and (ii) the carrier frequency associated with the given sample.

9. The method of claim 1, wherein the selecting is based on (i) the carrier frequency associated with the given sample, and (ii) the spatial stream associated with the given sample.

10. The method of claim 1, wherein the selecting is based on (i) the symbol associated with the given sample, (ii) the carrier frequency associated with the given sample, and (iii) the spatial stream associated with the given sample.

11. A communication device for detecting data in a received multiple-input-multiple-output (MIMO) signal, the communication device comprising:

N antennas configured to receive, via a transmission channel, N respective signals, the received signals being associated with (i) M sets of data values, (ii) a set of symbols, and (iii) a set of carrier frequencies, wherein N and M are non-zero positive integers;

one or more integrated circuit (IC) devices configured to implement a plurality of data detection techniques, form the N signals into a received signal vector y and perform one or more transformations on the received signal vector y to obtain a transformed vector, form a plurality of samples from the transformed vector, each sample of the plurality of samples being associated with (i) a spatial stream of a set of spatial streams, (ii) a symbol of the set of symbols, and (iii) a carrier frequency of the set of carrier frequencies, and select, for samples of the plurality of samples, a data detection technique of the plurality of data detection techniques to be used in detecting data of a given sample, the selecting being based on at least one of the spatial stream, the symbol, and the carrier frequency associated with the given sample, based on a first data detection technique being selected, use a set of equalizer modules of the one or more IC devices to implement the first data detection technique, and based on a second data detection technique being selected, (a) disable one or more equalizer modules of the set of equalizer modules to implement the second data detection technique, or (b) modify one or more operations performed in an equalizer module of the set of equalizer modules, and modify one or more inputs to the set of equalizer modules to implement the second data detection technique.

12. The communication device of claim 11, wherein the one or more IC devices are configured to use the selected data detection technique to detect data of the given sample.

13. The communication device of claim 11, wherein the one or more IC devices are configured to
compute a signal-to-interference ratio (SIR) or a signal-to-noise ratio (SNR) associated with the given sample; and
compare the computed SIR or SNR or both to a threshold, wherein the one or more IC devices are configured to select the data detection technique for the given sample based on the comparison.

14. The communication device of claim 11, wherein the plurality of data detection techniques includes (i) maximum likelihood (ML) techniques, (ii) a zero-forcing (ZF) technique, and (iii) a technique that includes operations of both the ML techniques and the ZF technique.

15. A method of detecting data in a received multiple-input-multiple-output (MIMO) signal, the method comprising:
receiving, via a transmission channel, N signals from N respective antennas, the received signals being associated with (i) M sets of data values, (ii) a set of symbols, and (iii) a set of carrier frequencies, wherein N and M are non-zero positive integers;
forming the N signals into a received signal vector y and performing one or more transformations on the received signal vector y to obtain a transformed vector;
forming a plurality of samples from the transformed vector, each sample of the plurality of samples being associated with (i) a spatial stream of a set of spatial streams, (ii) a symbol of the set of symbols, and (iii) a carrier frequency of the set of carrier frequencies;
selecting, for samples of the plurality of samples, a data detection technique of a plurality of data detection techniques to be used in detecting data of a given sample, the selecting being based on at least one of the spatial stream, the symbol, and the carrier frequency associated with the given sample; and
using the selected data detection technique to detect data of the given sample,
wherein the selecting comprises,
selecting a first data detection technique of the plurality of data detection techniques for processing samples associated with a first symbol of the set of symbols, and
selecting a second data detection technique of the plurality of data detection techniques for processing samples associated with a second symbol of the set of symbols, wherein the first data detection technique is different than the second data detection technique.

* * * * *